(12) United States Patent
Tachibana et al.

(10) Patent No.: US 6,266,151 B1
(45) Date of Patent: Jul. 24, 2001

(54) IMAGE FORMING APPARATUS FOR IMAGE FORMATION ON SHEET

(75) Inventors: Tatsuto Tachibana, Numazu; Kaoru Sato, Minami Ashigara; Yoji Serizawa; Atsuya Takahashi, both of Gotenba, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,698

(22) Filed: Sep. 28, 1999

(30) Foreign Application Priority Data

Sep. 29, 1998 (JP) .................................................. 10-275930
Sep. 21, 1999 (JP) .................................................. 11-267051
Sep. 21, 1999 (JP) .................................................. 11-267057

(51) Int. Cl.$^7$ .............................. B41B 15/00; B41J 15/00
(52) U.S. Cl. ............................ 358/1.4; 358/1.5; 358/1.6; 358/1.9; 358/1.12; 358/1.15; 358/1.16
(58) Field of Search .................................. 358/400, 406, 358/407, 296, 1.4, 1.5, 1.6, 1.9, 1.12, 1.13, 1.15, 1.16, 1.14; 399/82, 83

(56) References Cited

U.S. PATENT DOCUMENTS 4,497,569   2/1985  Booth, Sr. ........................... 355/14 R
5,124,809 * 6/1992  Koishikawa ........................ 358/400
5,669,040   9/1997  Hisatake ............................. 399/83

FOREIGN PATENT DOCUMENTS 0479494   4/1992  (EP) ................................ H04N/1/32
09231028  9/1997  (JP) ................................. G06F/3/12

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

There is disclosed an image forming apparatus comprising input means for inputting print data from the exterior, ID setting means for setting an ID for each page of the print data inputted by the input means, print condition designation means for designating the print condition, corresponding to the ID set by the ID setting means, print reservation means for reserving a print operation by storing the ID and the print condition in a print reservation memory, control means for causing the reserved print operation to be executed according to the content of the print reservation memory, and reservation cancellation means adapted, upon receiving an instruction to cancel a print reservation, to erase the corresponding ID and print condition from the print reservation memory, if a sheet corresponding to the designated ID in the print reservation memory is in a stand-by state for sheet feeding.

28 Claims, 37 Drawing Sheets

FIG. 7

STATUS INFORMATION FOR EACH ID

| BIT | CONTENTS |
|---|---|
| 1ST BIT | 0 |
| 2ND BIT | ID-1 IN PRINTING *1 |
| 3RD BIT | ID-2 IN PRINTING *1 |
| 4TH BIT | ID-3 IN PRINTING *1 |
| 5TH BIT | ID-4 IN PRINTING *1 |
| 6TH BIT | ID-5 IN PRINTING *1 |
| 7TH BIT | ID-6 IN PRINTING *1 |
| 8TH BIT | ID-7 IN PRINTING *1 |
| 9TH BIT | ID-8 IN PRINTING *1 |
| 10TH BIT | ID-9 IN PRINTING *1 |
| 11TH BIT | ID-10 IN PRINTING *1 |
| 12TH BIT | ID-11 IN PRINTING *1 |
| 13TH BIT | ID-12 IN PRINTING *1 |
| 14TH BIT | ID-13 IN PRINTING *1 |
| 15TH BIT | ID-14 IN PRINTING *1 |
| 16TH BIT | ODD PARITY |

FIG. 10

STATUS INFORMATION OF ID-N (STATUS Xn)

| BIT | CONTENTS |
|---|---|
| 1ST BIT | 0 |
| 2ND BIT | ID-N SHEET POSITION CODE $2^2$ (*1) |
| 3RD BIT | ID-N SHEET POSITION CODE $2^1$ (*1) |
| 4TH BIT | ID-N SHEET POSITION CODE $2^0$ (*1) |
| 5TH BIT | ID-N DESIGNATED SHEET FEED PORT CODE $2^3$ |
| 6TH BIT | ID-N DESIGNATED SHEET FEED PORT CODE $2^2$ |
| 7TH BIT | ID-N DESIGNATED SHEET FEED PORT CODE $2^1$ |
| 8TH BIT | ID-N DESIGNATED SHEET FEED PORT CODE $2^0$ |
| 9TH BIT | ID-N DESIGNATED SHEET DISCHARGE PORT CODE $2^2$ |
| 10TH BIT | ID-N DESIGNATED SHEET DISCHARGE PORT CODE $2^1$ |
| 11TH BIT | ID-N DESIGNATED SHEET DISCHARGE PORT CODE $2^0$ |
| 12TH BIT | ID-N SHEET SIZE CODE $2^3$ |
| 13TH BIT | ID-N SHEET SIZE CODE $2^2$ |
| 14TH BIT | ID-N SHEET SIZE CODE $2^1$ |
| 15TH BIT | ID-N SHEET SIZE CODE $2^0$ |
| 16TH BIT | ODD PARITY |

(*1) SHEET POSITION CODE

| $2^2$ | $2^1$ | $2^0$ | SHEET POSITION |
|---|---|---|---|
| 0 | 0 | 0 | SHEET FEED STANDBY STATE OR SHEET DISCHARGE END STATE |
| 0 | 0 | 1 | IN SHEET FEEDING |
| 0 | 1 | 0 | VERTICAL SYNC END & IN IMAGE PRINTING |
| 1 | 0 | 0 | IMAGE PRINTING END & IN SHEET DISCHARGING |

FIG. 13

ID TABLE

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 1 | 1 | 1 | 1 | 0 | P |

LOWER SHEET FEED PATH TABLE

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 1 | 0 | 0 | 0 | 0 | P |

UPPER SHEET FEED PATH TABLE

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | P |

COMMON SHEET FEED PATH TABLE

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 1 | 0 | 0 | 0 | P |

⋮

FD SHEET DISCHARGE PATH TABLE

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 0 | P |

⋮

TWO-FACE SHEET INVERSION PATH TABLE

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 1 | 0 | 0 | P | |

| | |
|---|---|
| PRINTING RESERVATION POINTER → 0 | INDEFINITE |
| 0 | INDEFINITE |
| PRINTING EXECUTION POINTER → ID4 CODE | POINTER FOR ID4 INFORMATION |
| ID6 CODE | POINTER FOR ID6 INFORMATION |
| ID2 CODE | POINTER FOR ID2 INFORMATION |
| ID5 CODE | POINTER FOR ID5 INFORMATION |
| 0 | INDEFINITE |
| 0 | INDEFINITE |
| 0 | INDEFINITE |
| 0 | INDEFINITE |

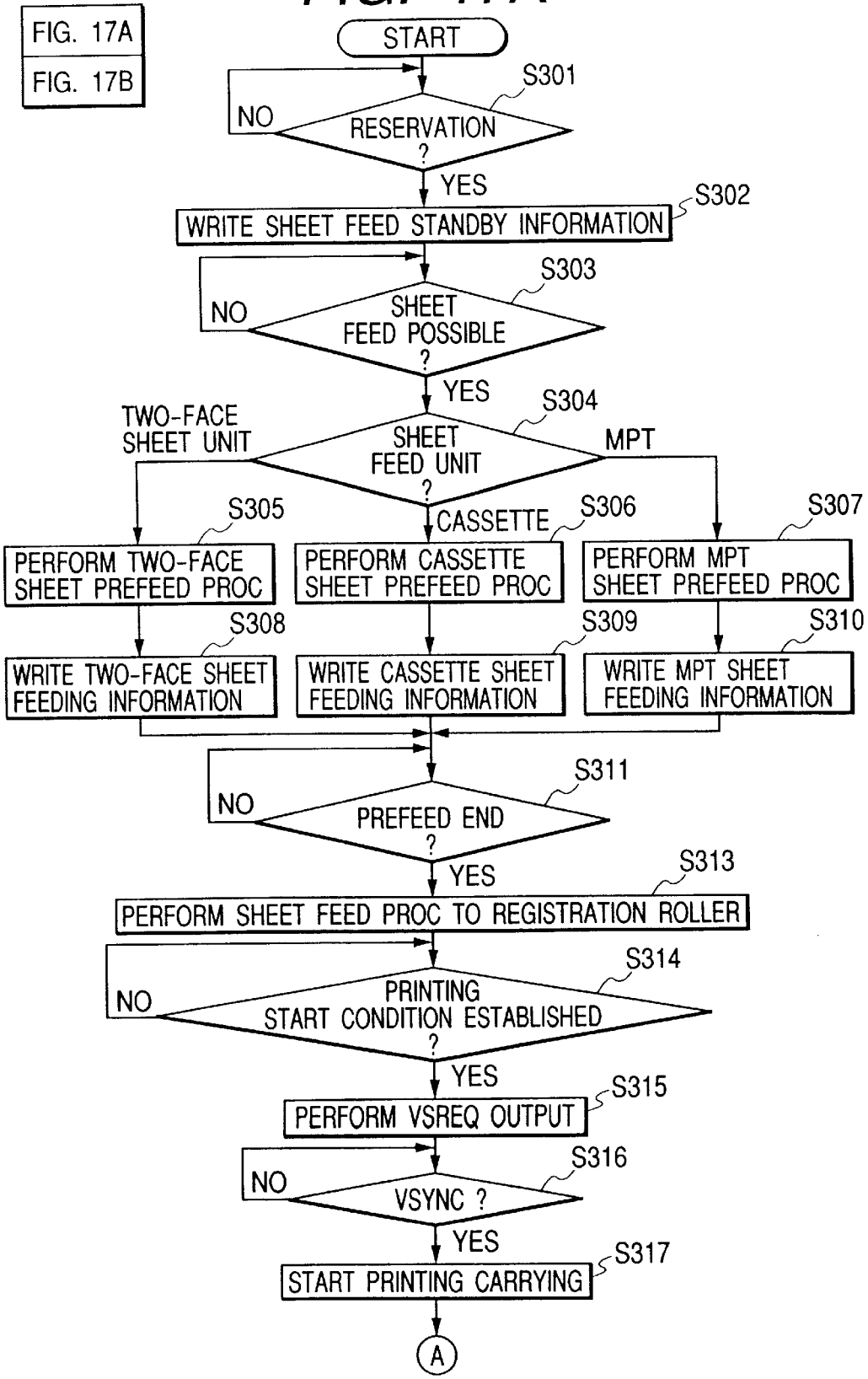

FIG. 26
COMMAND STRUCTURE

| BIT | CONTENTS |
|---|---|
| 1ST BIT | 0 |
| 2ND BIT | COMMAND CODE 5 |
| 3RD BIT | COMMAND CODE 4 |
| 4TH BIT | COMMAND CODE 3 |
| 5TH BIT | COMMAND CODE 2 |
| 6TH BIT | COMMAND CODE 1 |
| 7TH BIT | COMMAND CODE 0 |
| 8TH BIT | PRINTING SHEET FEED PORT DESIGNATION CODE 3 |
| 9TH BIT | PRINTING SHEET FEED PORT DESIGNATION CODE 2 |
| 10TH BIT | PRINTING SHEET FEED PORT DESIGNATION CODE 1 |
| 11TH BIT | PRINTING SHEET FEED PORT DESIGNATION CODE 0 |
| 12TH BIT | PRINTING SHEET DISCHARGE PORT DESIGNATION CODE 2 |
| 13TH BIT | PRINTING SHEET DISCHARGE PORT DESIGNATION CODE 1 |
| 14TH BIT | PRINTING SHEET DISCHARGE PORT DESIGNATION CODE 0 |
| 15TH BIT | PREFEED RESERVATION DESIGNATION |
| 16TH BIT | 0 |

FIG. 30

COMMAND STRUCTURE 2

| BIT | CONTENTS |
|---|---|
| 1ST BIT | 0 |
| 2ND BIT | COMMAND CODE 3 |
| 3RD BIT | COMMAND CODE 2 |
| 4TH BIT | COMMAND CODE 1 |
| 5TH BIT | COMMAND CODE 0 |
| 6TH BIT | PRINTING SHEET FEED PORT DESIGNATION CODE 2 |
| 7TH BIT | PRINTING SHEET FEED PORT DESIGNATION CODE 1 |
| 8TH BIT | PRINTING SHEET FEED PORT DESIGNATION CODE 0 |
| 9TH BIT | PRINTING SHEET DISCHARGE PORT DESIGNATION CODE 1 |
| 10TH BIT | PRINTING SHEET DISCHARGE PORT DESIGNATION CODE 0 |
| 11TH BIT | PREFEED RESERVATION NUMBER DESIGNATION BIT 3 |
| 12TH BIT | PREFEED RESERVATION NUMBER DESIGNATION BIT 2 |
| 13TH BIT | PREFEED RESERVATION NUMBER DESIGNATION BIT 1 |
| 14TH BIT | PREFEED RESERVATION NUMBER DESIGNATION BIT 0 |
| 15TH BIT | PREFEED RESERVATION DESIGNATION |
| 16TH BIT | 0 |

FIG. 33

COMMAND STRUCTURE 3

| BIT | CONTENTS |
|---|---|
| 1ST BIT | 0 |
| 2ND BIT | COMMAND CODE 4 |
| 3RD BIT | COMMAND CODE 3 |
| 4TH BIT | COMMAND CODE 2 |
| 5TH BIT | COMMAND CODE 1 |
| 6TH BIT | COMMAND CODE 0 |
| 7TH BIT | PRINTING SHEET FEED PORT DESIGNATION CODE 2 |
| 8TH BIT | PRINTING SHEET FEED PORT DESIGNATION CODE 1 |
| 9TH BIT | PRINTING SHEET FEED PORT DESIGNATION CODE 0 |
| 10TH BIT | PRINTING SHEET DISCHARGE PORT DESIGNATION CODE 1 |
| 11TH BIT | PRINTING SHEET DISCHARGE PORT DESIGNATION CODE 0 |
| 12TH BIT | PREFEED SEET FEED PORT DESIGNATION BIT 2 |
| 13TH BIT | PREFEED SEET FEED PORT DESIGNATION BIT 1 |
| 14TH BIT | PREFEED SEET FEED PORT DESIGNATION BIT 0 |
| 15TH BIT | PREFEED RESERVATION DESIGNATION |
| 16TH BIT | 0 |

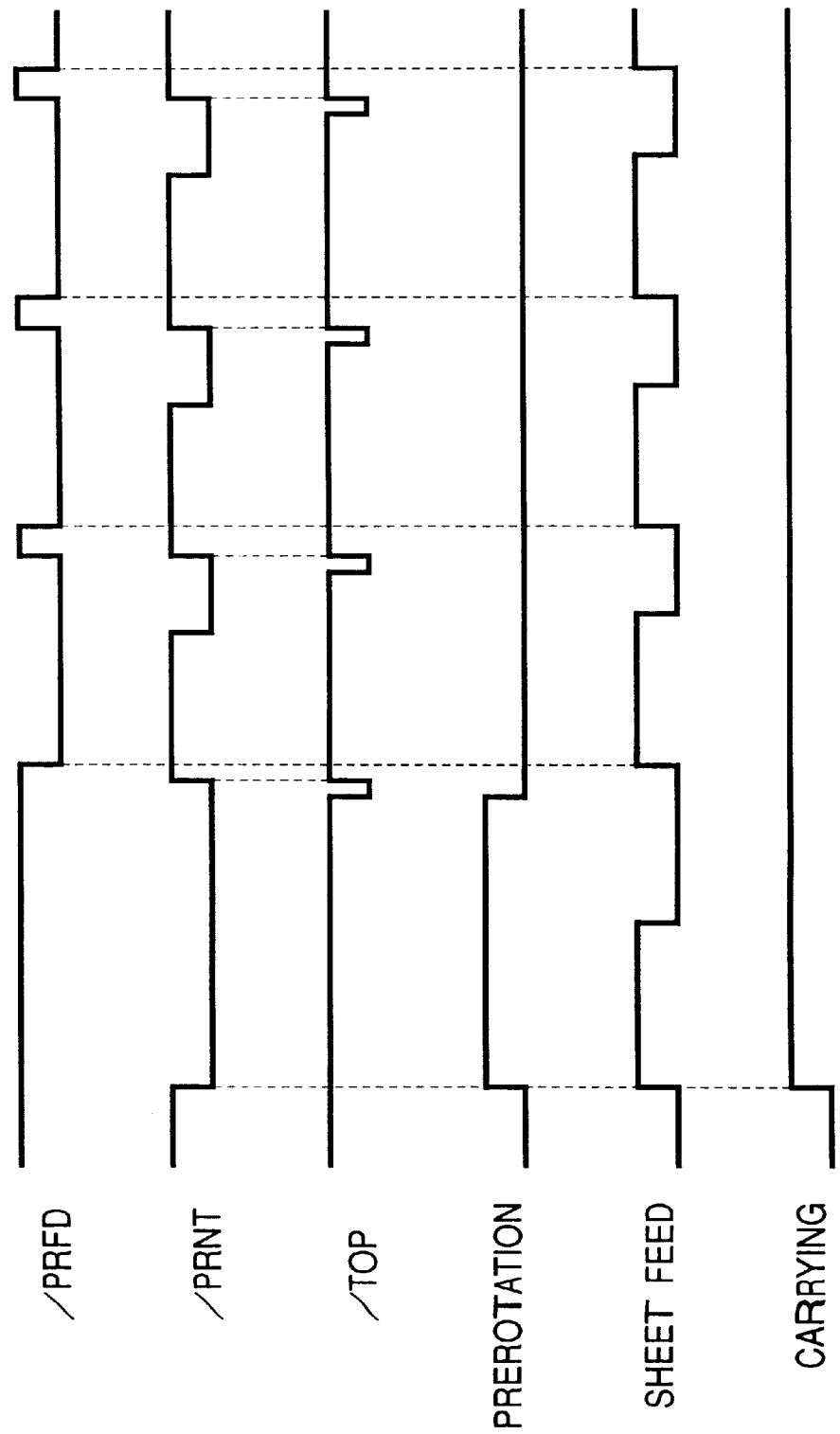

IMAGE FORMING APPARATUS FOR IMAGE FORMATION ON SHEET

BACKGROUND OF THE INVENTION

1. Field of the Invention

The present invention relates to an image forming apparatus capable of managing image formation status for each sheet.

2. Related Background Art

In the conventional image forming apparatus, there is only externally outputted the status information of the entire apparatus such as a state of preparing for printing, a state of image formation, a state of sheet carrying in progress, or the information on the number of sheet carried in the apparatus.

As the conventional image forming apparatus does not externally output the information on the individual sheet managed in the apparatus, it has been associated with following drawbacks, since the external device or the user utilizing such image forming apparatus is incapable of recognizing the state of carrying or printing of the individual sheet.

More specifically, in case the printing operation in the image forming apparatus is not completed in the normal state, the same image has to be printed after the image forming apparatus is restored to the normal state. As the completion of the image formation or of the sheet discharge on the individual sheet cannot be known from the outside, the external device sending the image information to the image forming apparatus has to retain the image formation with a certain marginal time after the output of the print instruction to the image formation apparatus, and such requirement limits the amount of the simultaneously storable image data.

Also in case the image forming apparatus is connected to a network, the operator is unable to recognize the state of execution of the printing job from the position of the operator, and, in case of an abnormality in the image forming apparatus, the operator has to go to the location of the image forming apparatus in order to confirm whether the printing job of the operator has been properly completed. Also, if the printing job has not been completed in proper state, the operator has to return to the location of the output device and to repeat the image output.

Also in case the image forming apparatus is connected to a sheet input/output device such as a large-capacity sheet feeding deck or a sheet sorter, the external control device for collectively controlling such input/output devices has to manage the sheet carrying state in the image forming apparatus by the timing based on a specified reference (for example the output of a print start command), and is therefore unable to exactly manage the transfer of the sheet among various devices. Particularly the sheet management becomes very difficult in case the order of printing in the image forming apparatus and the order of input/output of the sheets are mutually different, for example in case of two-side printing.

Also, some printing apparatus have a print reserving function for designating the print conditions in the order of execution. However, in the conventional printing apparatus with such print reserving function, the reserved printing job can be deleted only by the owner of the printing job, but there is not provided a function of deleting the job, changing the print condition or changing the order of reservations after the execution is started.

The printing operation by the printing apparatus is enabled after various units of the printing apparatus (printer engine) are activated in response to the print instruction from a host computer or the like. On the other hand, the print data forming apparatus (video controller) for supplying the printing apparatus with the print data forms the print data for supply to the printing apparatus based on the print information from an external device such as the host computer connected to the print data forming apparatus or from an operator. In general, in response to the reception of the print information from the exterior, the print data forming apparatus executes reservation of the printing operation in the printing apparatus, prior to the formation of the print data. Thus the starting-up of the printing apparatus to the printing state and the print data formation in the print data forming device are executed in parallel manner in order to shorten the time required to the start of the printing operation.

In case the print data forming apparatus receives plural print information from the exterior, plural print jobs may be reserved in the printing apparatus prior to the completion of the formation of the plural print data.

The printing apparatus having the print reserving function prepares for the execution of the printing in the order of the printing jobs reserved from the print data forming apparatus, and waits for the print instruction therefrom.

In the printing apparatus, the reserved printing job may become not executable during the print instruction stand-by state, namely in the period from the reservation of the printing job to the completion of the print data formation in the print data forming apparatus.

However, in the conventional printing apparatus not provided with the functions of changing the reserved print condition, changing the order of reservation or deleting the job after the start of execution, if plural print jobs are reserved and a print job with an earlier order of execution becomes not executable, all the print jobs of the subsequent order of execution become not executable.

Otherwise, in the conventional printing apparatus provided only with the function of collectively deleting the print reservations, in case a reserved print job becomes not executable, it is necessary to collectively delete all the print reservations and to execute the print reservations anew.

FIG. 36 is a block diagram of a control unit of a conventional printer.

There are shown a printer controller 1101 for executing communication with and image data reception from a host computer, development of received image data into the information printable by the printer, and signal exchange and serial communication with a printer engine control unit to be explained later; an engine control unit 1102 for controlling various units of the printer engine through signal exchange and serial communication with the printer controller; a sheet size detection unit 1103 for detecting the sheet size in the cassette and transmitting the information to the engine control unit; a sheet feed unit sheet presence/absence detection unit 1104 for detecting the presence/absence of the sheet in the cassette, manual sheet insertion slot, optional cassette and envelope feeder and transmitting the information to the engine control unit; an option presence/absence detection unit 1105 for confirming the state of connection of the options such as the optional cassette and the envelope feeder; a sheet carrying control unit 1106 for controlling the sheet carrying; an optical system control unit 1107 for controlling an optical system including for example a scanner motor and a laser; a fixing temperature control unit 1108 for controlling the temperature of a fixing unit and detecting the abnormality thereof; an option control unit 1109 for instructing the operation of the options such as the optional cassette and the envelope feeder; and a sensor input unit 1110 for detecting the presence/absence of the sheet in various carrying paths such as a registration path, a discharge path, a two-side path and an inversion path.

In the following there will be explained signals between the printer controller and the engine control unit. There are shown a /CPRDY signal 1111 indicating that the printer controller is in a state capable of communication with the engine; a /PPRDY 1112 indicating that the engine control unit is in a state capable communication with the printer controller; a /RDY signal 1113 indicating that the engine control unit is in a stand-by state capable of printing operation; a /PRNT signal 1114 for issuing a print demand from the printer controller to the engine control unit; a /TOP signal 1115 constituting a vertical synchronization signal outputted from the engine control unit to the printer controller; a /PRFD signal 1116 from the printer controller for causing the engine control unit to effect a sheet pre-feeding operation; a /BD signal 1117 constituting a horizontal synchronization signal outputted from the engine control unit to the printer controller; a /SCLK signal 1118 constituting a synchronization clock signal for serial communication; a /CMD signal 1119 constituting a command signal from the printer controller to the engine control unit; a /CBSY signal 1120 constituting a strobe signal for command output; a /STS signal 1121 indicating the status of the engine, to be outputted in response to a command from the printer controller; and a /SBSY signal 1122 for status output. FIG. 37 shows the timing of the serial communication mentioned above. In response to a command outputted from the printer controller, a corresponding status is outputted in 1-to-1 relationship. The synchronization clock signal is outputted from the printer controller. The serial communication is executed with 8 bits, in which the least significant bit LSB is used as a parity bit.

FIG. 38 shows a conventional printing sequence, which is independent from the exchange of command and status by the serial communication shown in FIG. 37.

Upon receiving the /PRNT signal from the printer controller 1101, the engine control unit 1102 executes a sheet feeding operation and a pre-rotation process for starting up the electrophotographic process. Then the /TOP signal is outputted to the printer controller 1101 for vertical synchronization for the image writing. Subsequently the printer controller 1101 sends the /PRFD signal to the engine control unit 1102, in order to start the feeding of a next sheet. In response, the engine control unit 1102 picks up a sheet. Then, in response to the /PRNT signal, the /TOP signal is outputted to execute the image writing. The above-explained sequence is repeated to execute the continuous printing operation.

In the above-described conventional printer, however, the engine control unit 1102 cannot execute the sheet feeding operation for the next page until the establishment of the vertical synchronization for the image data of the preceding page, namely until the reception of the /PRFD signal responding to the output of the /TOP signal. Consequently, the high-speed printing can only be achieved by selecting a sheet feeding speed higher than in the ordinary printing operation, thereby reducing the time required for sheet feeding.

Such high-speed sheet feeding is achieved for example by selecting the high or low sheet feeding speed with an exclusive motor in the sheet feeding system or providing a mechanism for switching the gear ratio, thus involving an increased cost. This drawback is particularly conspicuous in an image forming apparatus with a long sheet feeding path.

SUMMARY OF THE INVENTION

An object of the present invention is to provide an image forming apparats not associated with the above-mentioned drawbacks, and a control method therefor.

Another object of the present invention is to provide an image forming apparatus capable of managing the reserved print job for each sheet, and easily achieving interchange of jobs, alteration of job, cancellation thereof etc., and a control method therefor.

Still another object of the present invention is to provide an image forming apparatus capable of managing the reserved print job for each sheet and informing the status of image formation for each sheet to the exterior of the printer engine, and a control method therefor.

Still another object of the present invention is to provide an image forming apparatus capable of managing the reserved print job by an ID for each sheet, thereby facilitating the control from the exterior of the printer engine, and a control method therefor.

Still another object of the present invention is to provide an image forming apparatus capable of increasing the throughput of image formation by a process outside the printer engine, and a control method therefor.

Still another object of the present invention is to provide an image forming apparatus capable of increasing the throughput of image formation by executing the pre-feeding of the recording sheet as quickly as possible.

Other objects and features of the present invention will become fully apparent from the following description to be taken in conjunction with the attached drawings.

BRIEF DESCRIPTION OF THE DRAWINGS

FIG. 7 is a view showing the content of each bit of the ID status information;

FIG. 10 is a view showing the content of each bit of the ID status information;

FIG. 13 is a view showing the configuration of a table for each carrying unit, indicating the sheet position;

FIG. 16 is a view showing a printing reservation table;

FIG. 26 is a view showing the command configuration in the eighth embodiment;

FIG. 30 is a view showing the command structure in a ninth embodiment;

FIG. 33 is a view showing the command structure in a tenth embodiment;

FIG. 38 is a timing chart showing a conventional printing sequence.

DETAILED DESCRIPTION OF THE PREFERRED EMBODIMENTS

First Embodiment

Figure 1:
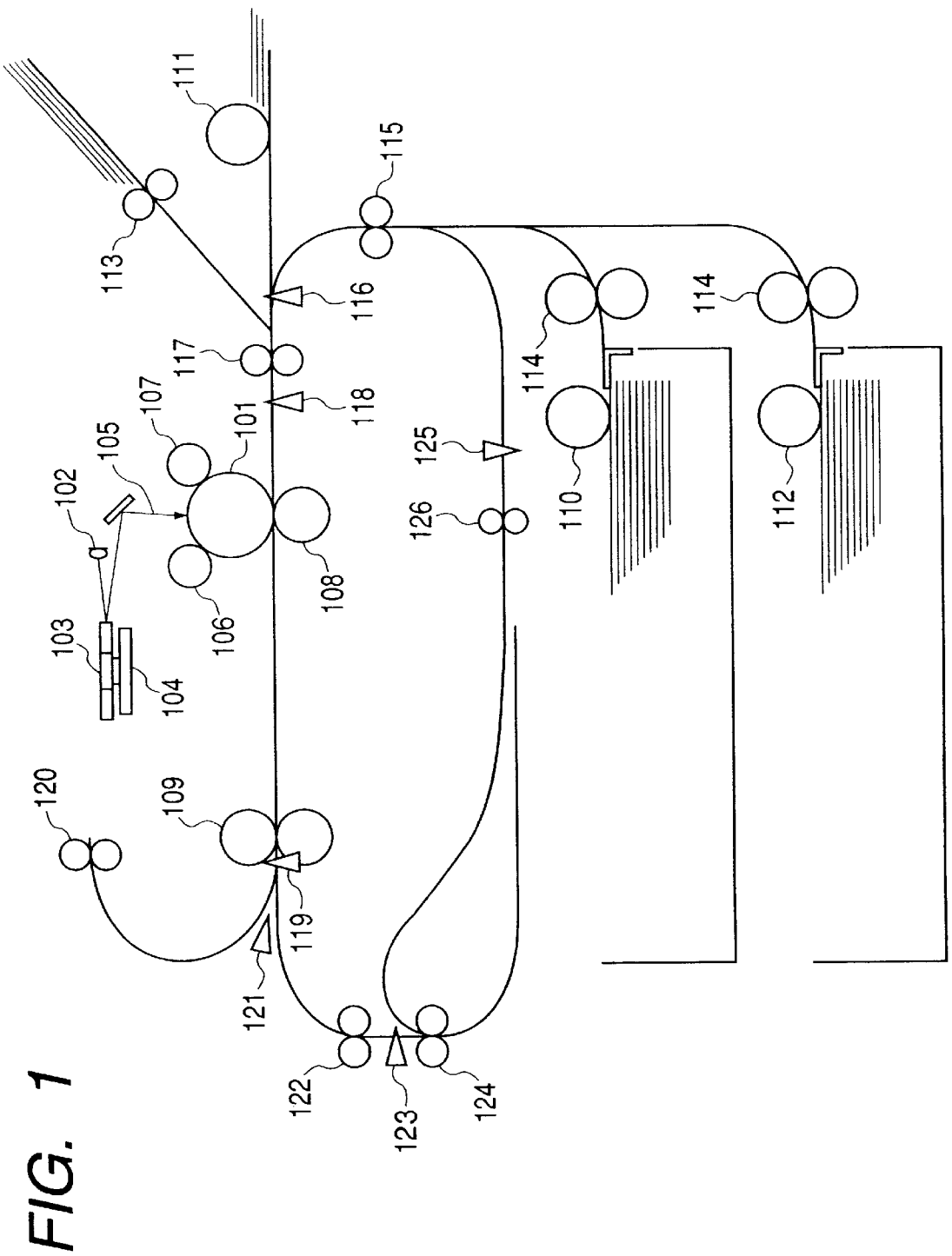
FIG. 1 is a lateral cross-sectional view showing the configuration of a printer in which the present invention is applicable.

FIG. 1 is a view showing the configuration of a printer in which the present invention is applicable, wherein shown are a photosensitive drum 101 constituting an image bearing member; a semiconductor laser 102 serving as a light source; a rotary polygon mirror 103 rotated by a scanner motor 104; and a laser beam 105 emitted from the semiconductor laser 102 and scanning the photosensitive drum 101.

There are also shown a charging roller 106 for uniformly charging the photosensitive drum 101; a developing unit 107 for developing an electrostatic latent image, formed on the photosensitive drum 101, with toner; a transfer roller 108 for transferring the toner image, developed by the developing unit 107, onto a predetermined recording sheet; and a fixing unit 109 for thermally fusing the toner transferred onto the recording sheet.

There are also shown a cassette sheet feeding roller 110 capable, by a rotation, of feeding a sheet from a cassette, provided with the function of identifying the size of the recording sheet, and advancing the sheet to a carrying path; a manual insertion sheet feeding roller 111 for advancing a sheet, from a manual insertion sheet feeding slot, not provided with the function of identifying the size of the recording sheet, to the carrying path; an optional cassette sheet feeding roller 112 for advancing a sheet from an optional cassette, not provided with the function of identifying the size of the recording sheet, to the carrying path; an envelope feeder sheet feeding roller 113 for advancing, one by one, the recording sheet from an envelope feeder capable of stacking envelopes only, to the carrying path; and carrying rollers 114, 115 for carrying the recording sheet fed from the cassette or the optional cassette.

There are further shown a pre-feed sensor 116 for detecting the leading end and trailing end of the fed sheet; a pre-transfer roller 117 for advancing the carried sheet to the photosensitive drum 101; a top sensor 118 for synchronizing the carrying of the fed sheet with the image writing (recording/printing) onto the photosensitive drum 101 and measuring the length of the fed sheet in the carrying direction; a sheet discharge sensor 1109 for detecting presence/absence of the sheet after fixation; and discharge rollers 120 for discharging the sheet after fixation from the apparatus.

There are further shown a flapper 121 for switching the destination (discharge tray or detachable two-face unit) of the printed sheet; carrying rollers 122 for carrying the sheet, carried to the detachable two-face unit, to an inversion unit; an inversion sensor 123 for detecting the leading/trailing end of the sheet carried to the inversion unit; and re-feeding rollers 124 for sequentially effecting forward/reverse rotation to invert the sheet, thereby advancing the sheet to a re-feeding unit.

Figure 2:
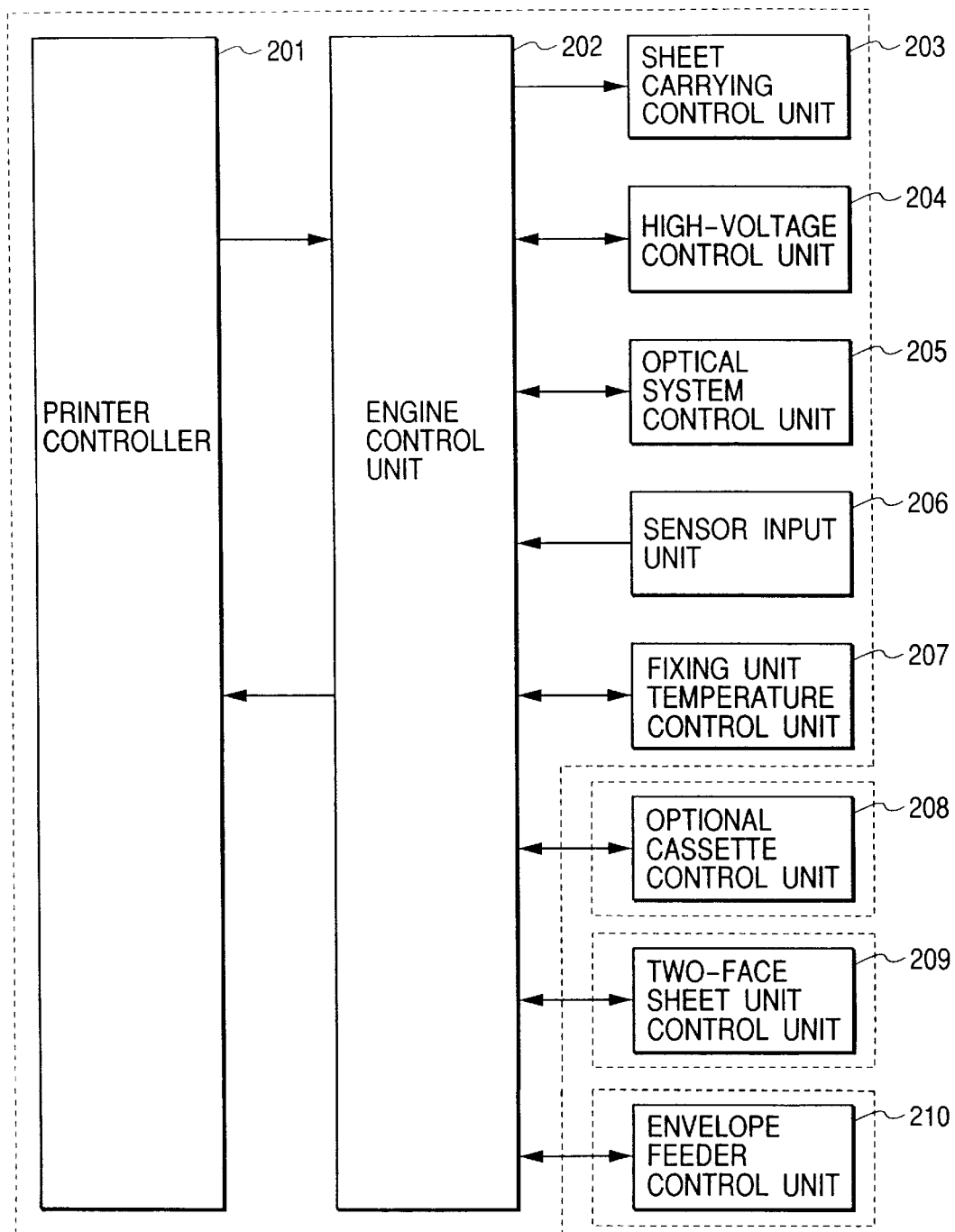
FIG. 2 is a block diagram showing the functional configuration of the printer.

FIG. 2 is a block diagram showing the circuit configuration of a control system for controlling the above-described mechanism, wherein show are a printer controller 201 for developing image code data, transferred from an external device such as an unrepresented host computer, into bit data reburied for the printing operation in the printer, and reading and displaying the internal information of the printer.

A printer engine control unit 202 controls the various units of the printer engine according to the instruction of the printer controller 201 and informs the internal information of the printer to the printer controller 201. A sheet carrying control unit 203 drives and stops the motors and rollers for carrying the recording sheet, according to the instruction of the printer engine control unit 202. A high voltage control unit 204 controls the high voltage output in the steps of charging, development and transfer according to the instruction of the printer engine control unit 202. An optical system control unit 205 drives and stops the scanner motor 104 and turns on the laser beam according to the instruction of the engine control unit 202. A fixing unit control unit 207 executes and stops the power supply to a fixing heater according to the instruction of the printer engine control unit 202.

A control unit 208 for the detachable optional cassette drives and stops the driving system according to the instruction of the printer engine control unit, and informs the printer engine control unit 202 of the presence/absence of the sheet and the sheet size information.

A control unit 209 for the detachable two-face unit executes inversion and re-feeding of the sheet according to the instruction of the printer engine control unit 202 and informs the engine control unit 202 of the status of such operations.

A control unit 210 for a detachable envelope feeder drives and stops the driving system according to the instruction of the printer engine control unit 202, and informs the printer engine control unit 202 of the presence/absence of sheet.

The printer controller 201 and the engine control unit 202 mutually execute 16-bit serial communication, and, in response to 16-bit command data transmitted from the printer controller 201, the engine control unit 202 returns 16-bit status data indicating the internal information of the engine, corresponding to the content of the received command. Also there is executed an operation corresponding to the content of the command.

Also the printer controller 201 and the engine control unit 202 manage the printing operation by an ID which is different for each sheet. The ID is designated from the printer controller 201 to the engine control unit 202, for each print instruction.

Figure 3:
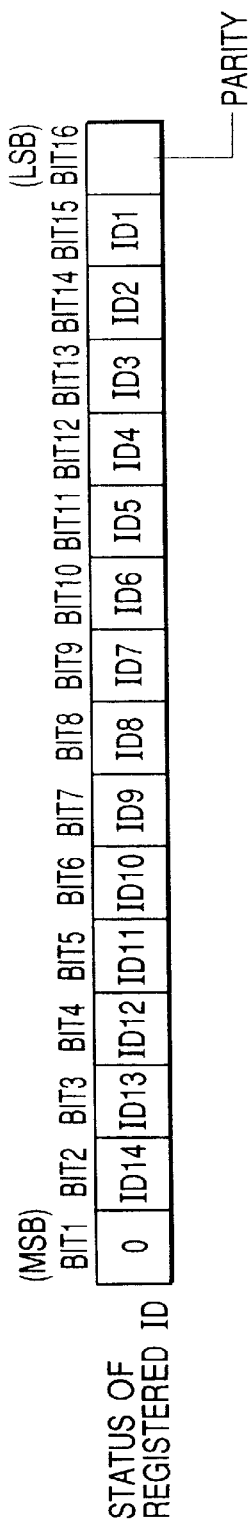
FIG. 3 is a view showing the data structure of ID management information.

FIG. 3 shows the status structure for managing the ID. In FIG. 3, a status of registered ID is composed of 16 bits in which the first bit constitutes the MSB and the 16th bit constitutes the LSB. Among these 16 bits, the first bit is defined as "0" while the 16th bit is used as the parity bit, and the remaining 14 bits are assigned for ID 1 to ID 14.

When an ID is designated by the printer controller 201, the engine control unit 202 sets "1" in a bit corresponding to the ID number, and resets the bit corresponding to the ID number to "0" when the printing operation corresponding to the ID number is completed and the discharge of the printed sheet to the discharge tray is completed. Consequently, a bit "1" corresponding to each ID indicates an ID registered in the engine control unit 202 for a printing operation in progress or to be executed, while a bit "0" indicates an ID that can be designated by the printer controller 201. The printer controller 201 can thus easily recognize and manage the print status of the printer, by managing the status of registered ID.

Figure 4:
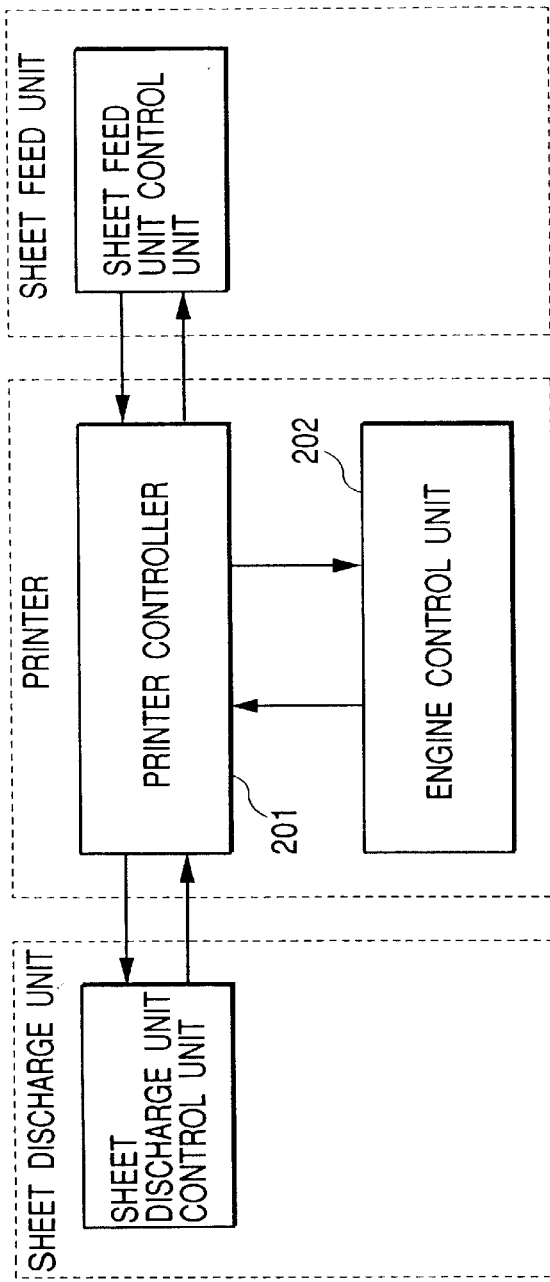
FIG. 4 is a block diagram showing the functional configuration in case an optional input/output device is connected to the printer.
Figure 5:
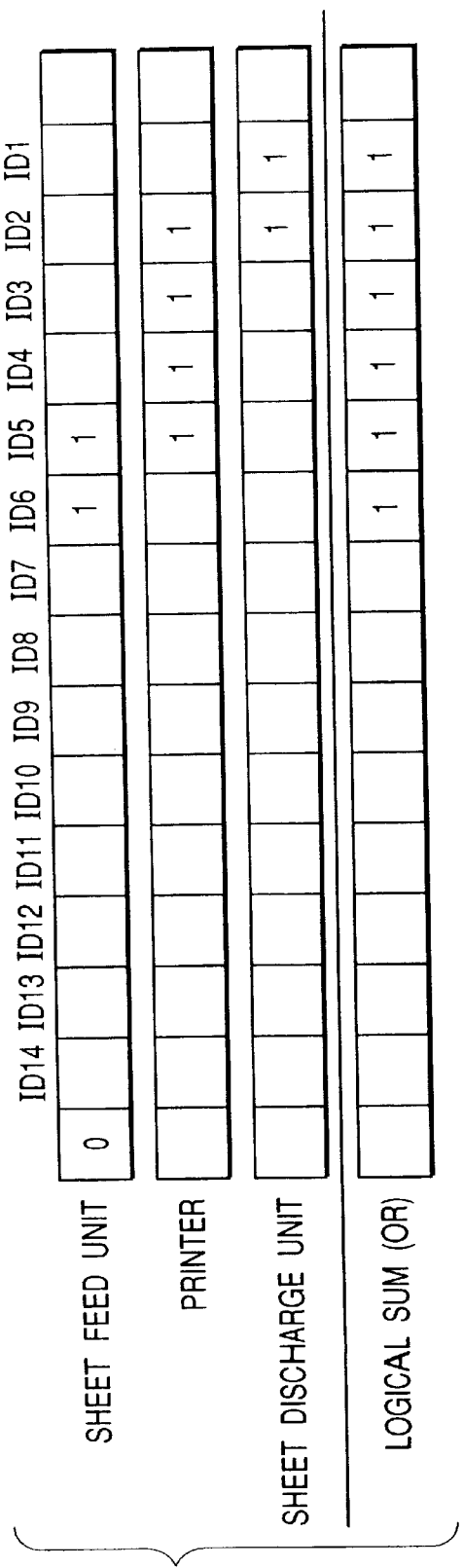
FIG. 5 is a view showing the data structure of ID management information.

In the present embodiment, there has been explained the sheet managing method by ID in the single printer alone, but such method becomes more effective in case the printer is connected to a sheet feeding unit and a sheet discharging unit as shown in FIG. 4 and the printer controller 201 manages the status of sheet in these units. More specifically it is possible to recognize and manage the sheet status in the entire printer system by giving sheet status not only to the printer itself but also the sheet feeding unit and the sheet discharging unit, also giving an ID to each status and calculating, by the printer controller 202, the logical sum of the bits of the status shown for each unit as shown in FIG. 5.

Second Embodiment

Figure 6:
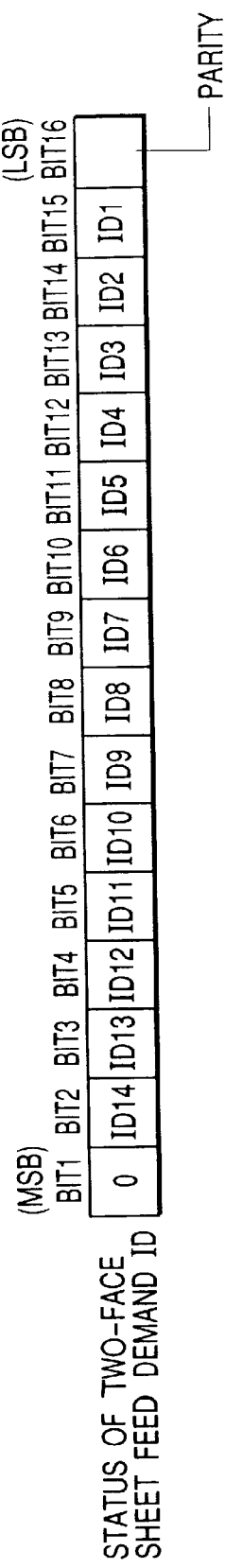
FIG. 6 is a view showing the configuration of status of two-face sheet feed requesting ID.

In the image forming apparatus of the present embodiment, there will be explained a method of managing first and second faces in the two-face printing operation with a same ID. In the present embodiment, there is provided a status indicating the ID that can be designated in the second face in the two-face printing operation (hereinafter called status of two-face sheet feed demand ID. The structure of the status is shown in FIG. 6.

When the sheet after the first-face printing is designated to be discharged to the two-face unit, the engine control unit 202 sets a corresponding ID bit of the two-face sheet feed demand ID status at "1", and clears this bit to "0" when the sheet feeding from the two-face units is designated again with the same ID. Therefore the printer controller 201 can recognize and manage the sheet carrying state in the two-face printing operation, by calculating the logical product or logical sum of the registered ID status explained in the first embodiment the two-face sheet feed demand ID status.

Third Embodiment

In the third embodiment, there will be explained an error recovery process to be executed between the printer controller 201 and the engine control unit 202.

FIG. 7 shows the content of status information transmitted from the engine control unit 202 to the printer control 201, in the serial communication executed therebetween.

Each of 16-bit information indicates ID information by "1" or "0". In FIG. 7, a mark "*1" indicates that a print instruction is received after the print reservation and the printer engine has either completed the vertical synchronization or has started the image printing after the vertical synchronization, when the ID bit of this status information is "1". Also the ID bit "0" indicates a state where the print reservation is not made, the print instruction is not made though the print reservation has been made, the vertical synchronization is not made though the print instruction has been given, or the vertical synchronization has been made and the corresponding sheet has been discharged from the apparatus.

Figure 8:
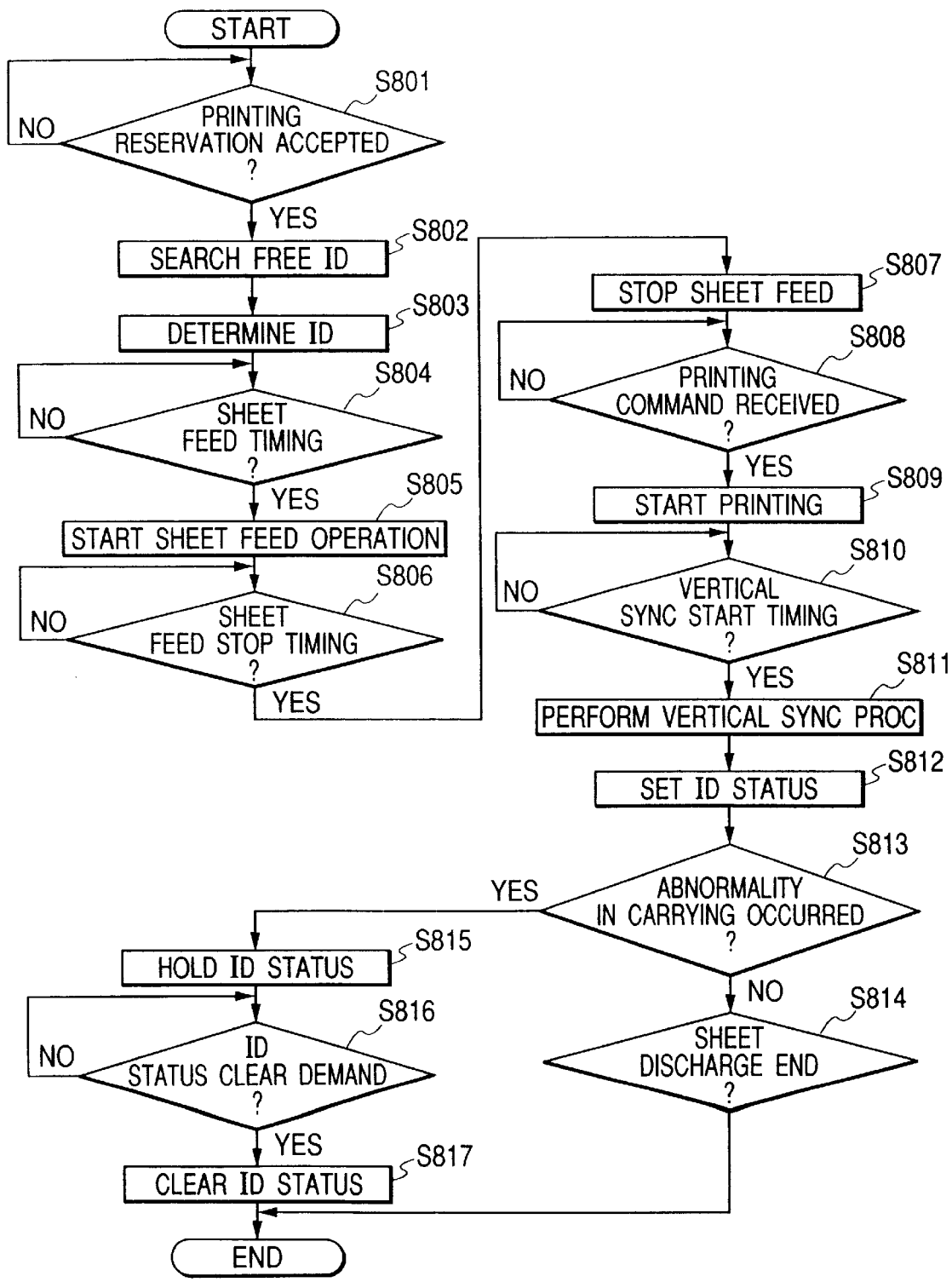
FIG. 8 is a flow chart showing the printing process in the engine control unit.

FIG. 8 is a flow chart showing the engine control sequence of the engine control unit 202 relating to the ID status in case of a jam.

Upon receiving a print reservation (S801), the engine control unit 202 searches an empty ID among the ID status (S802) and determines the ID (S803). Then it starts the sheet carrying process at a predetermined timing (S804, S805). When the sheet is carried to a predetermined sheet feed position (S806), the sheet carrying is terminated (S807).

It then waits until a print request is received (S808), and, upon receiving a print instruction from the printer controller 201, there is executed an ordinary printing operation (S809). Subsequently, when a timing is reached for starting the vertical synchronization (S810), it executes the vertical synchronization with the printer controller 201 (S811), and sets a corresponding ID bit of the above-mentioned status information at "1" (S812).

In case a jam is subsequently generated by some reason and the engine is stopped (S813), the engine control unit 202 retains the above-mentioned status information on ID at the state of jam generation (S815). This status is retained until a status clearing instruction is given from the printer controller 201 (S816).

Figure 9:
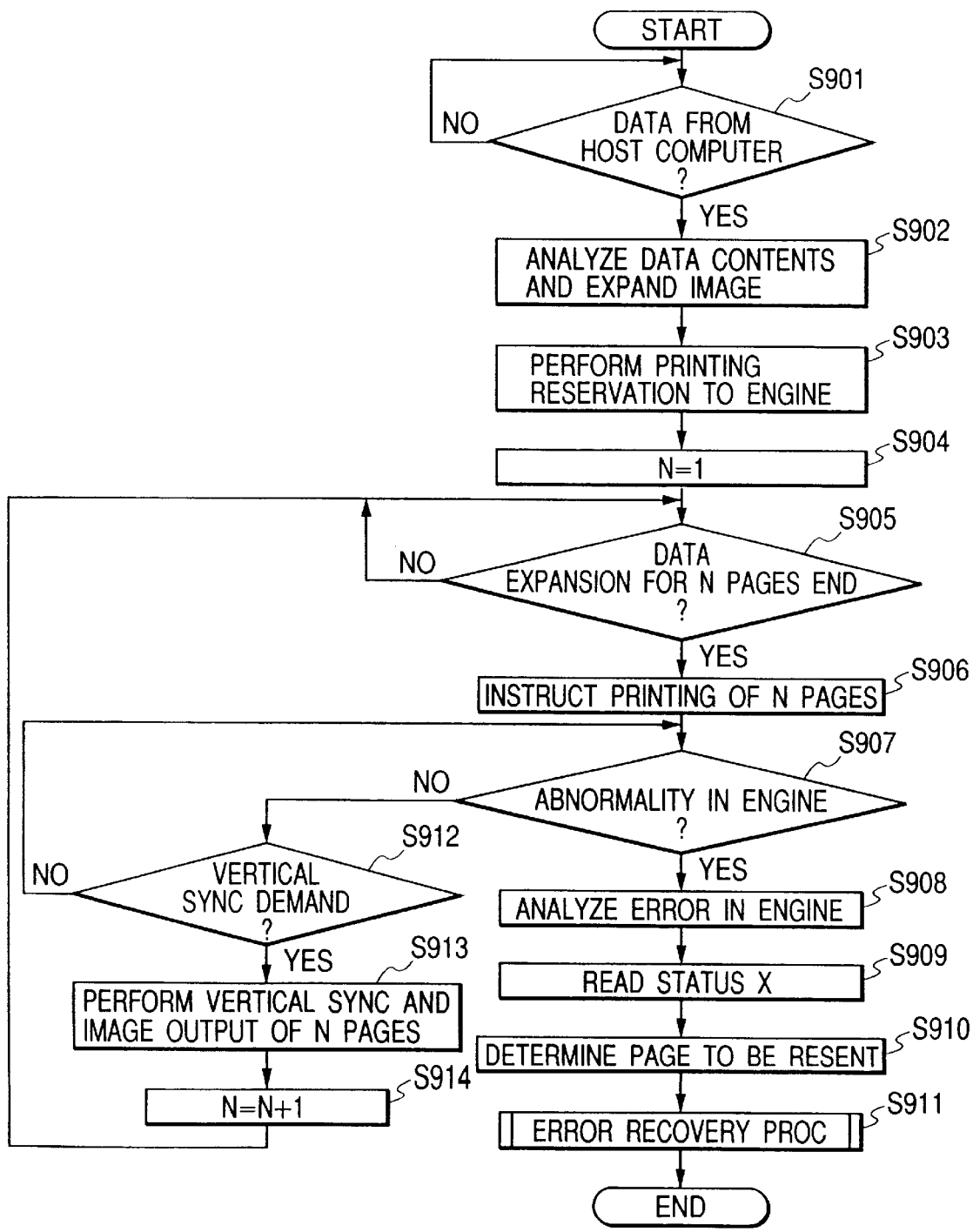
FIG. 9 is a flow chart showing the printing process in the printer controller.

FIG. 9 shows the sequence executed at the printer controller. At first, upon receiving data from a host computer (S901), the printer controller analyzes the content of the received data and executes development into image data (S902). Then it executes print reservation in the engine control unit 202 (S903). Then, upon completion of development of the data of the first page (in case of processing the initial page), it instructs the printing operation to the engine control unit (S904, S905 and S906).

Upon receiving error information such as a jam from the engine control unit 202 after the print instruction (S907), it analyzes the error information (S908) and reads the ID status information at this point (S909). Based on this operation, it determines the job of an ID bit at "1" as the page to be resent (S910), and executes the printing operation again after the jam processing (S911). On the other hand, if the printer engine has no abnormality and the vertical synchronization signal is requested from the engine control unit 201 (S912), the vertical synchronization signal and the image data are outputted to the engine control unit (S913). These operations are repeated for all the pages.

In this manner an appropriate recovery process can be provided to the user.

In addition to the structure shown in FIG. 7, the status information may assume the structure shown in FIG. 10 in which each ID has 16-bit information to indicate more precise positional information.

Fourth Embodiment

Figure 11:
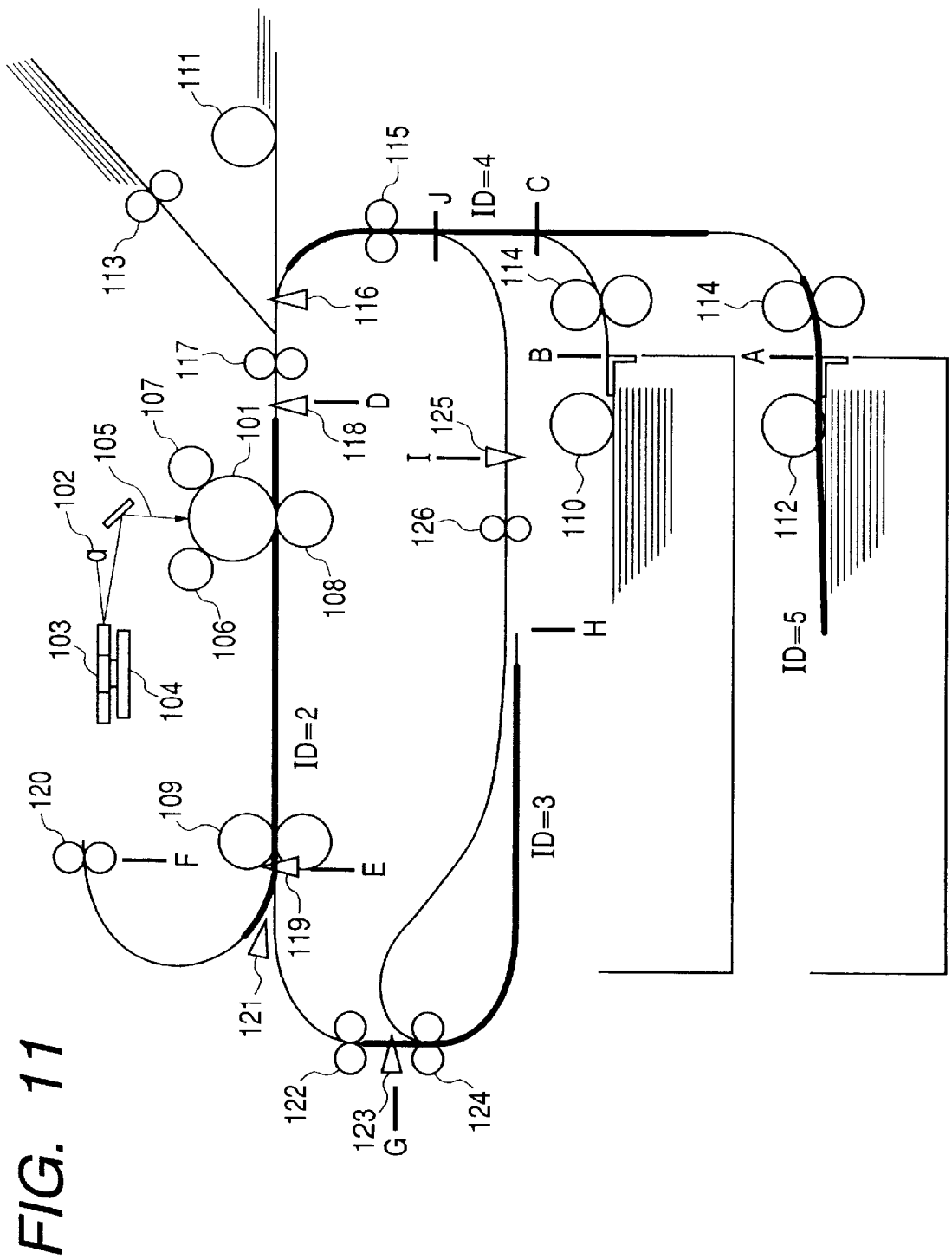
FIG. 11 is a cross-sectional view showing the sheet carrying state in the printer.

FIG. 11 shows the position of the sheet in the course of carrying in the printer. The feed paths are divided into blocks of a lower sheet feed path A-C, an upper sheet feed path B-C, a common sheet feed path C-D, an image forming path D-E, an FD sheet discharge path E-F, a two-face sheet discharge path E-G, a two-face inversion path G-H, a two-face sheet feed path G-I and a two-face sheet feed path I-J.

Figure 12:
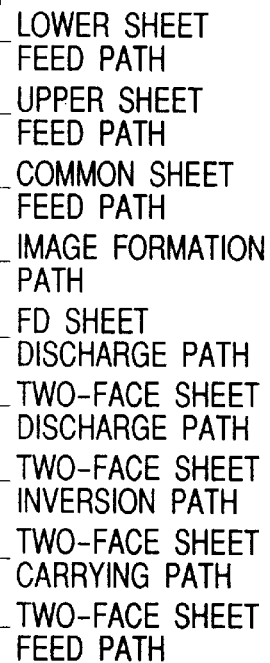
FIG. 12 is a view showing the configuration of an ID table for each sheet, indicating the sheet position.

There is illustrated a state where four sheet of ID=2, 3, 4 and 5 are fed in the sheet feed paths as indicated in an ID table shown in FIG. 12. Sheet position table information is provided for each sheet, and the sheet position table indicates the sheet feed path in which the sheet is currently present. FIG. 12 shows the sheet position table for the sheets of ID =2, 3, 4 and 5. More specifically, for the sheet with ID=2, as the leading end has reached the FD discharge path after image formation, a bit 5 (FD discharge path) of the sheet position table is set at "1". Similarly, for the sheet with ID=3, as the leading end is in the two-face inversion path, a bit 7 is set at "1". For the sheet with ID=4, a bit 3 is set at "1" as the leading end is in the common sheet feed path. For the sheet with ID=5, a bit 1 is set at "1" since the leading end is in the lower sheet feed path. When a sheet position status is requested from the printer controller 201, the engine control unit 202 returns the sheet position status corresponding to the sheet ID. The printer controller 201 can recognize the positions of all the sheets, by acquiring the sheet position statuses corresponding to all the sheet ID's and calculating the logical sum.

In the present embodiment, the sheet position is represented by the position of the leading end of the sheet, but more complete sheet position status can be obtained by preparing the sheet position table including also the trailing end of the sheet.

FIG. 13 shows the sheet position regrouped in the respective sheet feeding blocks, indicating the sheet ID present in each sheet feed path. The example shown in FIG. 13 indicates that the lower sheet feed path contains the sheet of ID=5, the upper sheet feed path contains no sheet, the common sheet feed path contains the sheet of ID=4, the FD discharge path contains the sheets of ID=2, and the two-face inversion path contains the sheet of ID=3. The printer controller 201 can recognize the positions of all the sheet present in the sheet feed paths also by this method.

In the present embodiment, there is employed information indicating the sheet feeding block in which the leading end of the sheet is present, but more complete sheet position status can be obtained by preparing the sheet feed path information including also the trailing end of the sheet.

Fifth Embodiment

In the following there will be explained the deletion of the job for which the print reservation is made.

Figure 14:
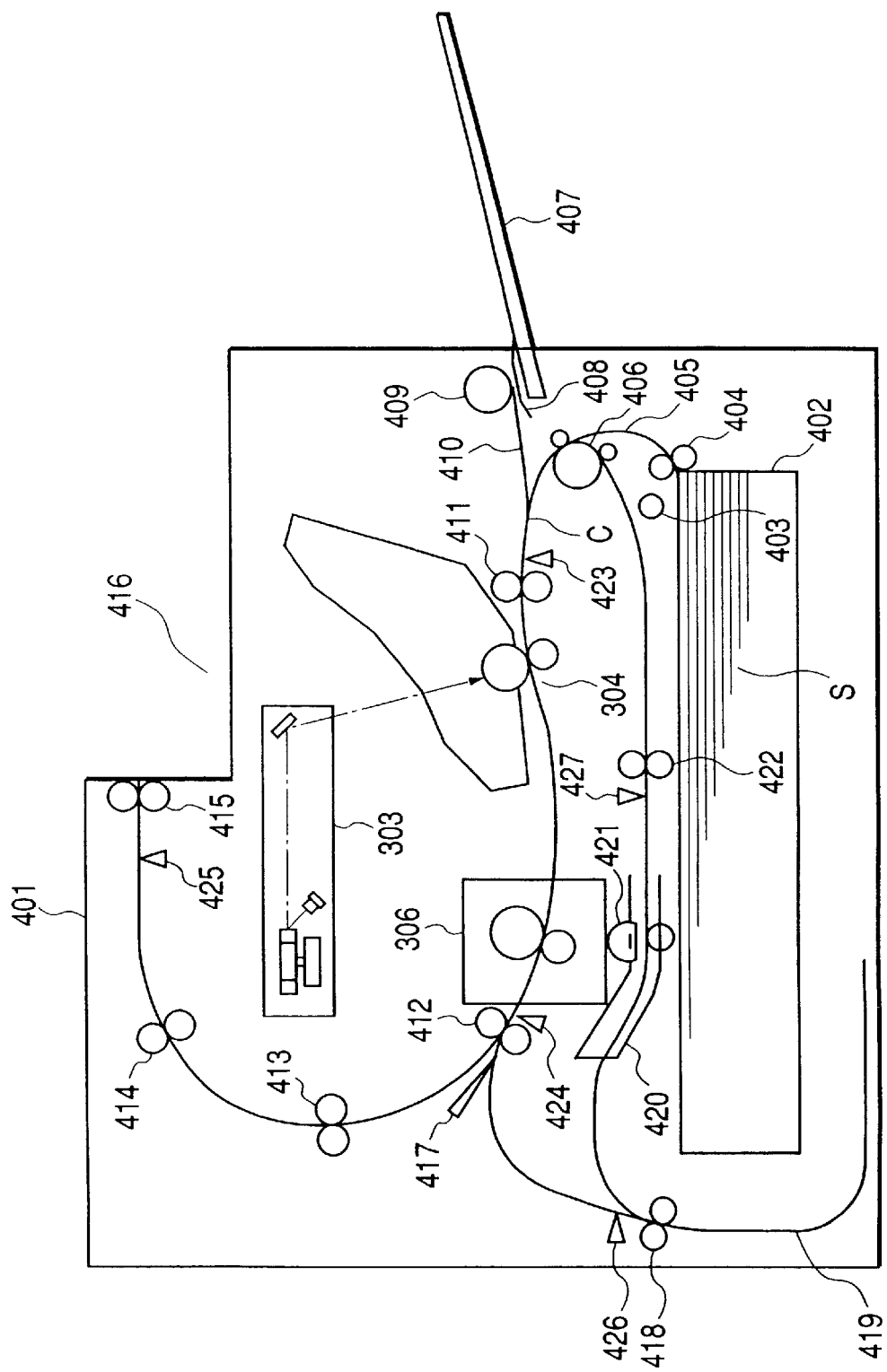
FIG. 14 is a cross-sectional view of a printing apparatus in which the present invention is applicable.

FIG. 14 is a cross-sectional view of a laser beam printer 401 having the function of managing the print information ID of the present invention.

The laser beam printer 401 is provided with a cassette 402 for containing recording sheets S, a pickup roller 403 for picking up a recording sheet from the cassette 402, feed rollers 404 for advancing the picked-up recording sheet, and, at the downstream side of the feed rollers 404, a carrying roller 406 for carrying the fed recording sheet to registration rollers 411 to be explained later.

The laser beam printer 401 is also provided with a multi purpose tray (MPT) 407 for enabling manual insertion of a sheet of predetermined size or unfixed size, an MPT sheet feed roller 409 for advancing the recording sheet from the MPT 407, and an MPT lifter 408 for pressing the recording sheets, set on the MPT 407, to the MPT sheet feed roller 409.

The sheet feed path 405 from the cassette 402 and that 410 from the MPT 407 are united at a junction point C and reach the registration rollers 411 to be explained later.

At the downstream side of the above-mentioned junction point C, there are provided registration rollers 411 for synchronized carrying of the recording sheet S, and an image forming unit 304 for forming an image by a laser beam from a laser scanner unit 303 is provided at the downstream side of the registration rollers 411. Also a fixing unit 306 is provided at the downstream side of the image forming unit 304, and sheet discharging rollers 412, 413, 414, 415 are provided at the downstream side of the fixing unit 306 to carry the recording sheet to a discharge tray 416.

The laser beam printer 401 is also provided with an automatic two-face printing function by inverting the recording sheet, bearing the image on a face, and feeding the recording sheet into the image forming unit 412 again to form images on both faces of the recording sheet.

A flapper 417 for changing the destination of the recording sheet S is provided at the downstream side of the discharge rollers 415, and, at a further downstream position there are provided an inversion roller 418 for changing the direction of the recording sheet S thereby effecting sheet inversion, and an inverted sheet container 419 for containing the recording sheet S at the inverting operation. At the downstream side of the carrying path after inversion of the recording sheet S by the inversion roller 418, there are provided a D-cut roller 421, a movable lateral registration plate 420, two-face carrying rollers 422. At the downstream side thereof, the sheet carrying path joins the sheet feed rollers 406.

For detecting the position of the recording sheet S, there are provided, on the sheet carrying paths, a pre-registration sensor 423 in front of the registration rollers 411, a fixation-discharge sensor 424 after the fixing unit 306, a discharge sensor 425 in front of the discharge tray 416, an inversion sensor 426 in front of the inversion roller 418 and a two-face sensor 427 in front of the two-face carrying rollers 422. Each of the sensors is so constructed as to detect the presence of the recording sheet S at the position of such sensor, that a light shielding plate upon contact with the recording sheet intercepts a photointerruptor from the light.

Figure 15:
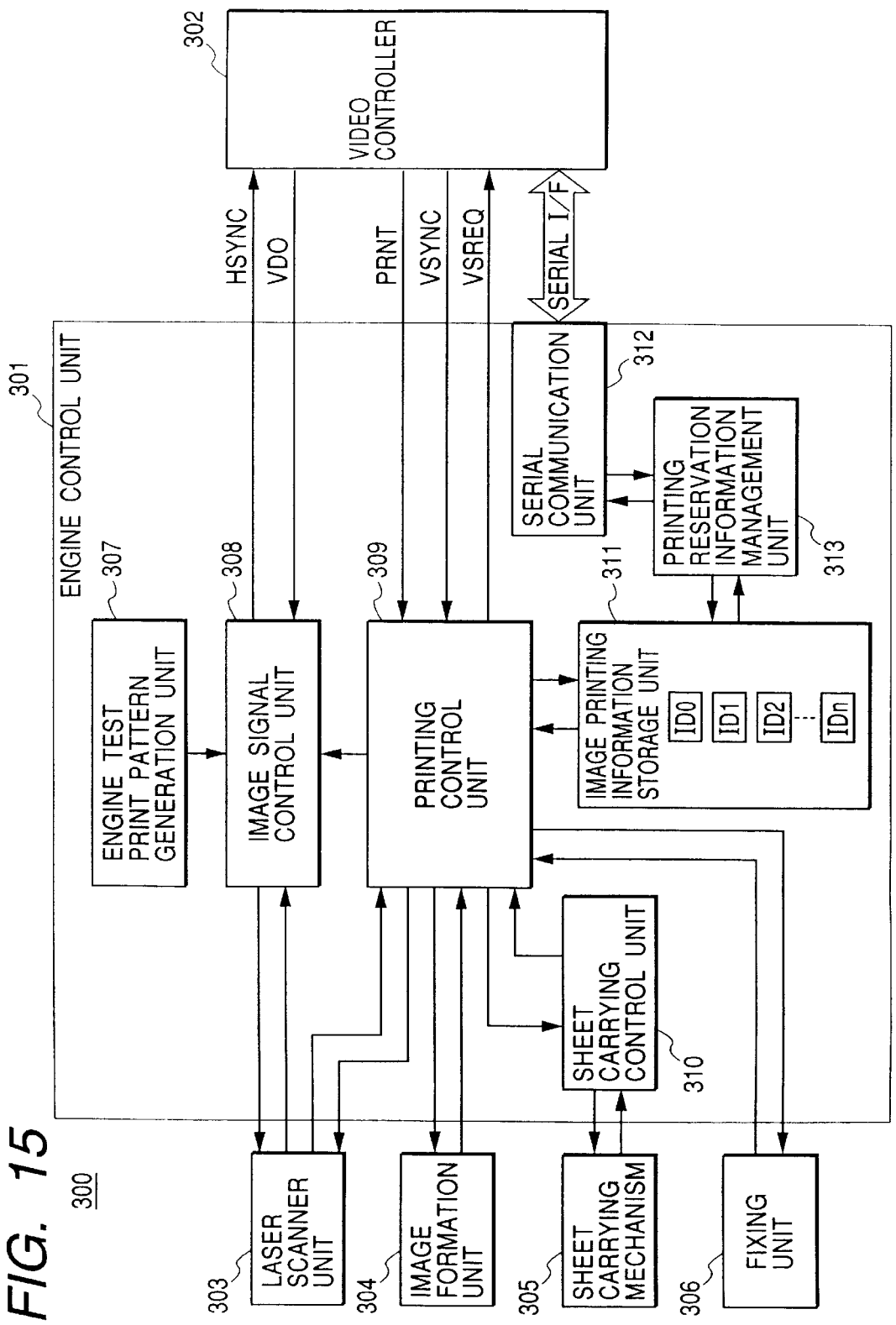
FIG. 15 is a block diagram showing the functional configuration of the printing apparatus.

FIG. 15 is a block diagram showing the configuration of the printing apparatus shown in FIG. 14.

The laser beam printer 401 is composed of an engine unit 200 for forming an image by an electrophotographic process, and a video controller unit 302 for generating an image signal for effecting image formation in the engine unit, based on drawing data transmitted from a host computer. The engine unit is provided with an engine control unit 301 for controlling the entire engine unit. The engine control unit 301 is composed of a CPU, a ROM, a RAM, gate elements etc., and the principal part of the control is realized by a software recorded in the ROM.

The engine control unit 301 is connected with the video controller 302 through signal lines HSYNC, VDO, PRNT, VSYNC, VSREQ to be explained later and a serial I/F for serial communication.

The engine control unit 301 is composed of an engine test print pattern generation unit 307, an image signal control unit 308, a print control unit 309, a sheet carrying control unit 310, an image print information memory unit 311, a serial communication unit 312, a print reservation information control unit 313 etc., and controls the laser scanner unit 303, image forming unit 304, fixing unit 306 described in the foregoing and a sheet carrying mechanism 305 consisting of driving mechanisms for the above-mentioned carrying rollers and the above-mentioned sheet sensors.

The video controller 302, upon receiving the drawing data from the host computer or the like, develops such drawing data into video data for output to the engine unit 300. It also assigns an ID for each image to be printed, designates information required for printing (source of sheet feeding, destination of sheet discharge, sheet size etc.) for each ID by serial communication to the engine control unit 301, and makes the print reservation by ID. For example 10 ID's are set for a job consisting of images of 10 pages. The engine control unit 301 stores the information of the source of sheet feeding, destination of sheet discharge, sheet size etc., designated for each ID, in an area assigned for each ID in the image print information memory unit 311, and also stores the order of printing in a print reservation table therein.

FIG. 16 is a view showing the conceptual structure of the print reservation table, in which the reserved ID codes and the pointers to the print information memory areas for the respective ID's, arranged in the order of printing. In the image print information memory unit 311, there is provided an area for collectively storing, for each ID, the above-mentioned print information such as the source of sheet feeding, destination of sheet discharge, sheet size etc. The pointer to the print information memory area includes a print reservation pointer and a print execution pointer, and designates the print information memory area of the corresponding ID. In an empty area, a special value indicating the empty state ("0" in the present embodiment) is set in the ID code area.

Figure 17B:
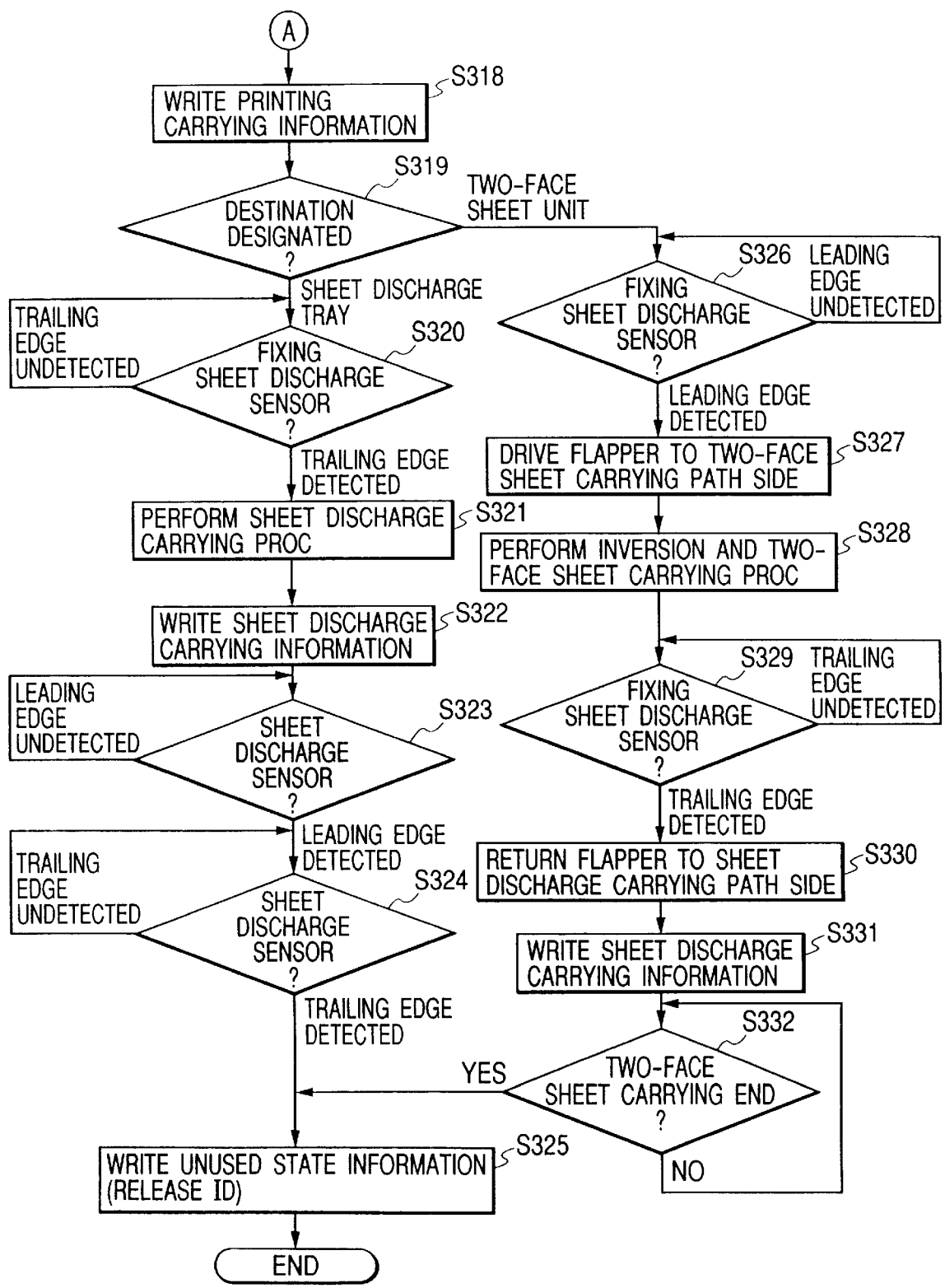
FIG. 17 which is composed of FIGS. 17A and 17B is a flow chart showing the control of the printing operation in a print control unit.

In the following there will be explained, with reference to a flow chart shown in FIGS. 17A and 17B, a printing sequence by the engine control unit 301.

Upon receiving the drawing data from the host computer or the like, the video controller 302 executes print reservation by setting an ID for each image in the engine control unit 301. The print reservation information management unit 113 stores the print reservation from the video controller 302 in the above-mentioned print reservation table. If at least a print reservation is present (step S301), the print control unit 109 waits until the sheet feed enabling condition from the source of sheet feeding designates by the reserved ID is satisfied (S303), and instructs the sheet carrying control unit 310 to execute the sheet pre-feeding operation (S304, S305, S306, S307, S308, S309 and S310). The discrimination of the presence of at least a print reservation will be explained later. The sheet feed enabling condition means, for example, that a predetermined distance to the preceding sheet can be secured and that the driving source for the sheet feeding mechanism has been started up. Also, the pre-feeding operation is to advance the recording sheet from the designated source to a position in front of the junction point C (cf. FIG. 14) with the carrying path from another sheet feeding source. In response to the sheet pre-feeding instruction from the print control unit 309, the sheet carrying control unit 310 executes the pre-feeding of sheet from the designated source.

If any of the laser scanner unit 330, the image forming unit 304 and the fixing unit 306 is not in a state enabling the printing operation at the reception of the print reservation from the video controller 302, the print control unit 309 causes such unit to initiate the starting-up to the state enabling the printing operation. Then the print control unit 309 discriminates whether the pre-feeding of the sheet corresponding to the ID of the order to be printed next is completed (S311), and, if completed, instructs the sheet carrying control unit 310 to advance such sheet to the registration rollers 411 (S313).

When the video data become ready for transmission, the video controller 302 sends a print instruction signal (hereinafter simply represented as PRNT signal) to the engine control unit 301 through a PRNT signal line.

The print control unit 309 awaits the starting-up of the laser scanner unit 330, image forming unit 304 and fixing unit 306, the completion of feeding of the recording sheet S to the registration rollers 411, and the output of the PRNT signal from the video controller 302 (S314). In response to the output of the PRNT signal, it starts the output of a horizontal (main scanning) synchronization signal (hereinafter simply represented as HSYNC signal) to the video controller 302. Also the print control unit 309 sends a vertical (sub scanning in the sheet carrying direction) synchronization request signal (hereinafter simply represented as VSREQ signal) to the video controller 302 through a VSREQ signal line (S315). In response thereto, the video controller 302 outputs a vertical synchronization signal VSYNC to the engine control unit 301 through a VSYNC signal line, and sends the video data as an image signal VDO to the engine control unit 301 through a VDO signal line. In this operation, the video controller 302 synchronizes the VDO signal with the HSYNC signal in the main scanning direction and with the VSYNC signal in the sub scanning direction. When the print control unit 309 receives the VSYNC signal (S316), the engine control unit 301 instructs the image signal control unit 308 to transmit the received VDO signal to the laser scanner unit 303, the print control unit 309 to control the image forming unit 304 and the sheet carrying control unit 310 to advance the recording sheet S, stopped at the registration rollers 411, in synchronization with the VSYNC signal (S317).

Through the above-described procedure, a predetermined image is formed on the recording sheet S. After the image formed on the sheet S is then fixed by the fixing unit 306, there is discriminated the destination of discharge designated for the ID of such image (S319). If the discharge destination designated by ID is the two-face carrying unit, the print control unit 309 shifts the flapper 417 toward the inversion roller 418 upon detection of the leading end of the recording sheet S, thereby controlling the carrying direction thereof (S326, S327), thus achieving sheet inversion for two-face process. When the trailing end of the recording sheet is detected by the fixation discharge sheet sensor 424 (S329), the flapper 417 is returned to the side of the sheet discharge path (S330), whereupon the two-face sheet carrying operation is terminated at a predetermined timing (S332). On the other hand, if the discharge destination designated by the ID is the discharge tray, the print control unit 309 maintains the flapper 417 in the direction toward the discharge tray, and executes the sheet discharging operation when the fixation sheet discharge sensor detects the trailing end of the recording sheet (S320, S321).

Steps S302, S308, S309, S310, S318, S322 and S331 set the information of the sheet carrying state for each ID in the image print information memory unit 311. The sheet carrying state is a stand-by state for sheet feeding, a state in sheet feeding, a state in sheet carrying for printing or a state in discharge. In addition there is provided an unused state as a special case, indicating the absence of the image related to the corresponding ID. Also in case the leading and trailing ends of the sheet in discharge are detected by the discharge sensor 425 (S323, S324) to terminate the sheet discharging state, there is also assumed the unused state (S325).

Figure 18:
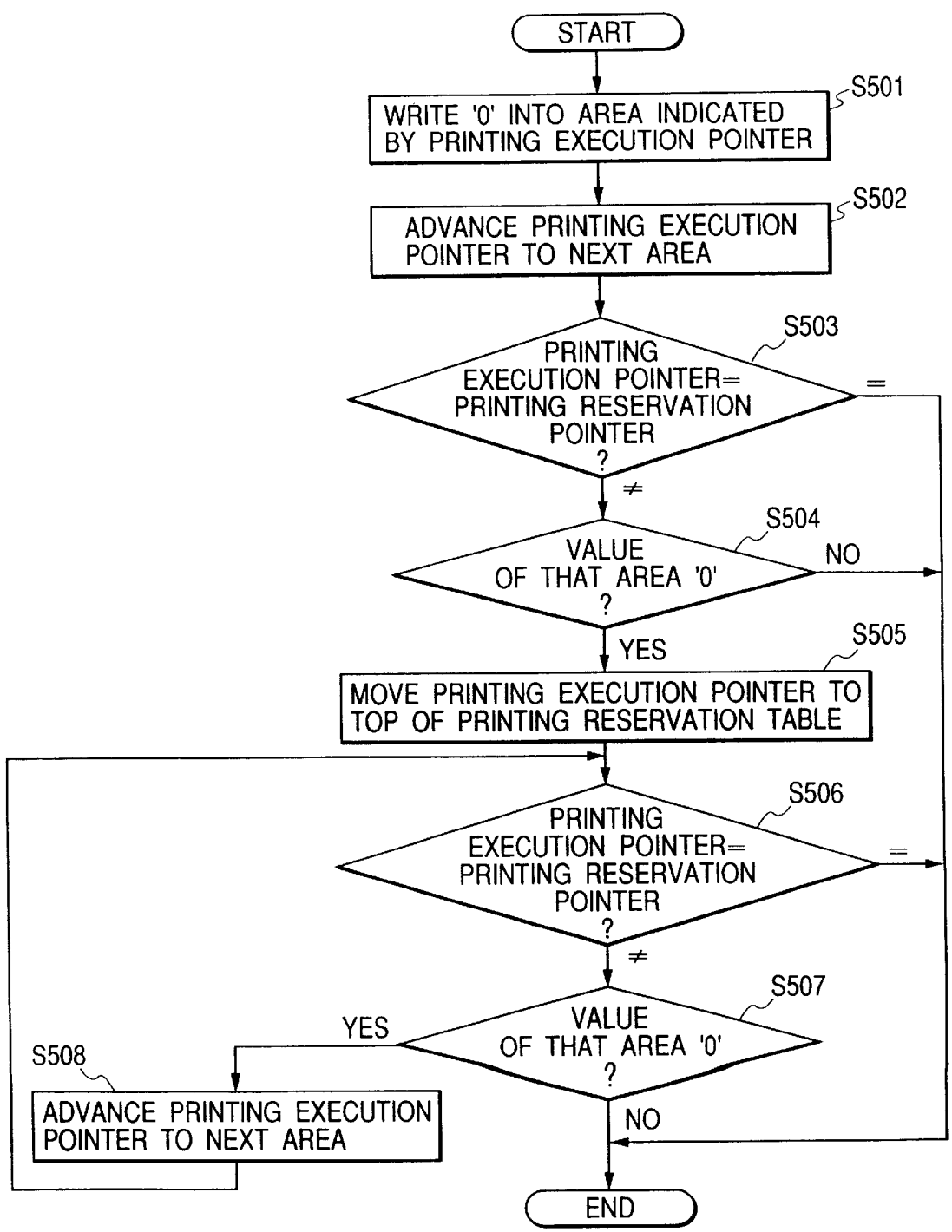
FIG. 18 is a flow chart showing the printer control of the printing reservation table in the print control unit.

Also the image print information memory unit 311 has a print reservation pointer and a print execution printer as information for controlling the print reservation table mentioned above. The print reservation pointer indicates an area for writing the reservation information on the print reservation table, in case a print reservation is received next from the video controller 302. The print execution pointer indicates an area in the table where the pointer is set for the print information of an ID to be printed next when a PRNT signal is received from the video controller 302. Upon receiving a print reservation from the video controller 302, the print reservation information management unit 313 writes a pointer to the print information of the reserved ID, in an area indicated by the above-mentioned print reservation pointer, and advances the print reservation pointer to a next position. In case the area indicated by the print reservation pointer is the last area of the print reservation table, the print reservation pointer is advanced to the top of thereof. Also at the start of the printing operation (S317 in FIG. 17A), the print reservation information management unit 313 shifts the print execution pointer to the pointer of a next reserved ID information. This process is shown in a flow chart in FIG. 18.

When the print control unit 309 initiates the printing operation in response to the PRNT signal from the video controller 302, the print reservation information management unit 311 writes "0" in the ID code of the area indicated by the print execution pointer, and shifts the print execution pointer to a next area in a step S502. Then a step S503 discriminates whether the next area indicated by the print execution pointer coincides with the area indicated by the print reservation pointer and, if so, the print execution pointer is stopped at such area and the process is terminated. If the step S503 identifies that the position of the print execution pointer is different from that of the print reservation pointer, a step S504 discriminates whether the ID code indicated by the print execution pointer is "0". If it is "0", a step S505 shifts the print execution pointer to the top of the print reservation table, and the sequence proceeds to a step S506. If the ID code of the area indicated by the print execution pointer is not "0", the pointer is stopped at such position and the sequence is terminated. A step S506 discriminates whether the next are indicated by the print execution pointer is same as that indicated by the print reservation pointer, and, if same, the print execution pointer is stopped at such position and the sequence is terminated. If the step S506 identifies that the position of the print execution pointer is different from that of the print reservation pointer, a step S507 discriminates whether the area indicated by the print execution pointer is "0", and, if "0", a step S508 advances the print execution pointer to a next area and the sequence returns to the step S506. If not "0", the pointer is stopped at such position and the sequence is terminated.

At the start of the printing operation, the print information reservation management unit 313 executes the above-described process on the print execution pointer, whereby the print execution pointer always indicates the ID for the print job to be executed next. Also, in case absence of the print reservation, the print execution pointer indicates an area same as the area indicated by the print reservation pointer having a value "0", whereby the print control unit 309 can judge presence or absence of the print reservation.

As explained in the foregoing, the engine control unit 301 executes preparations for the printing operation such as the sheet pre-feeding and the starting up of various units of the engine, in response to the print reservation from the video controller 302. Therefore, by the execution of the print reservation to the engine prior to the start of development of the video data, there can be executed the preparation for the transmission of the video data in the video controller 302 and the preparation for the printing operation in the engine in parallel manner. Consequently, in case plural drawing data are received from the host computer or the like, the video controller 302 executes the print reservation as early as possible in the engine control unit 301. However, in case the video controller 302 makes print reservations on plural images and if a part of the reserved print jobs becomes not executable because of the situation in the engine prior to the completion of development of the video data for a certain page, all the executable print jobs reserved after such print job that has become not executable also become not executable.

In the engine control unit 301 of the present embodiment, the print reservation information management unit 313 is provided with a function of deleting the reservation information, prior to the start of the sheet feeding operation, according to an instruction from the video controller 302.

Figure 19:
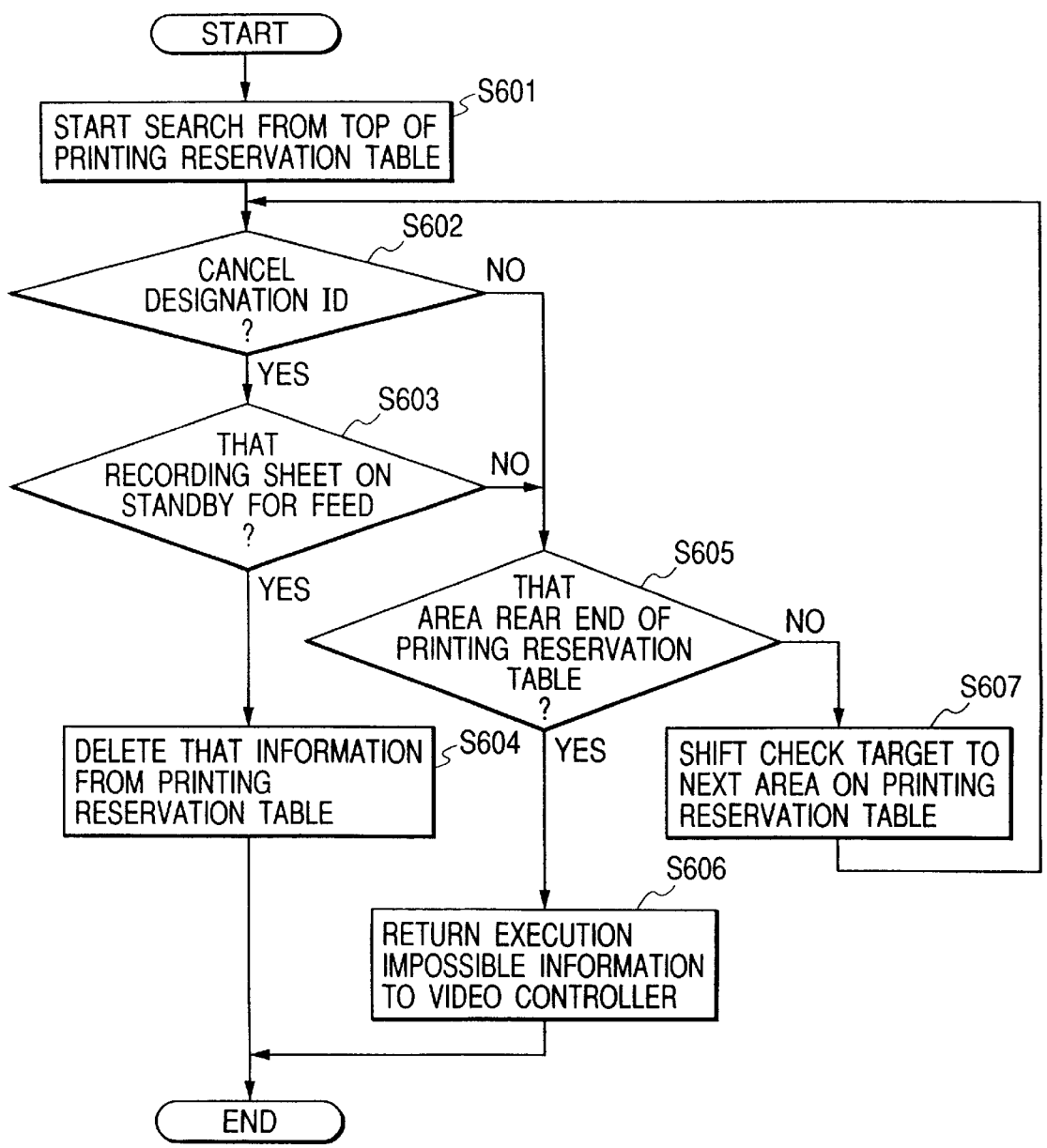
FIG. 19 is a flow chart showing the cancellation control for the print reservation of the designation ID in a fifth embodiment.

FIG. 19 shows a flow chart of the print reservation deleting process of the print reservation information management unit 313. At first when an instruction is given by serial communication from the video controller 302 for canceling the print reservation for an ID, the print reservation information management unit 313 sets, in a step S601, the object of ID check at the start of the print reservation table, and discriminates, in a step S602, whether the ID code of the checked area is the designated ID. If not, the sequence proceeds to a step S605 to discriminate whether the checked area is the end of the print reservation tables. If so, the corresponding reservation is judged absent, and a step S606 returns information indicating that the execution is impossible to the video controller 302 and the sequence is terminated. If the checked area is not the end of the table, a step S607 advances the area to be checked to a next area and the sequence returns to the step S602. If the step S602 identifies that the ID of the checked area is the designated ID, a step S603 discriminates, by the pointer to the print information indicated by such ID, whether the recording sheet for such ID is in the stand-by state for sheet feeding, and, if not, the reservation for such designated ID is identified as not cancelable. Then a step S606 returns information indicating that the execution is impossible to the video controller 302 and the sequence is terminated. If the step S603 identifies that the recording sheet for such designated ID is in the stand-by state, a step S604 deletes the information for such ID from the print reservation table.

Figure 20:
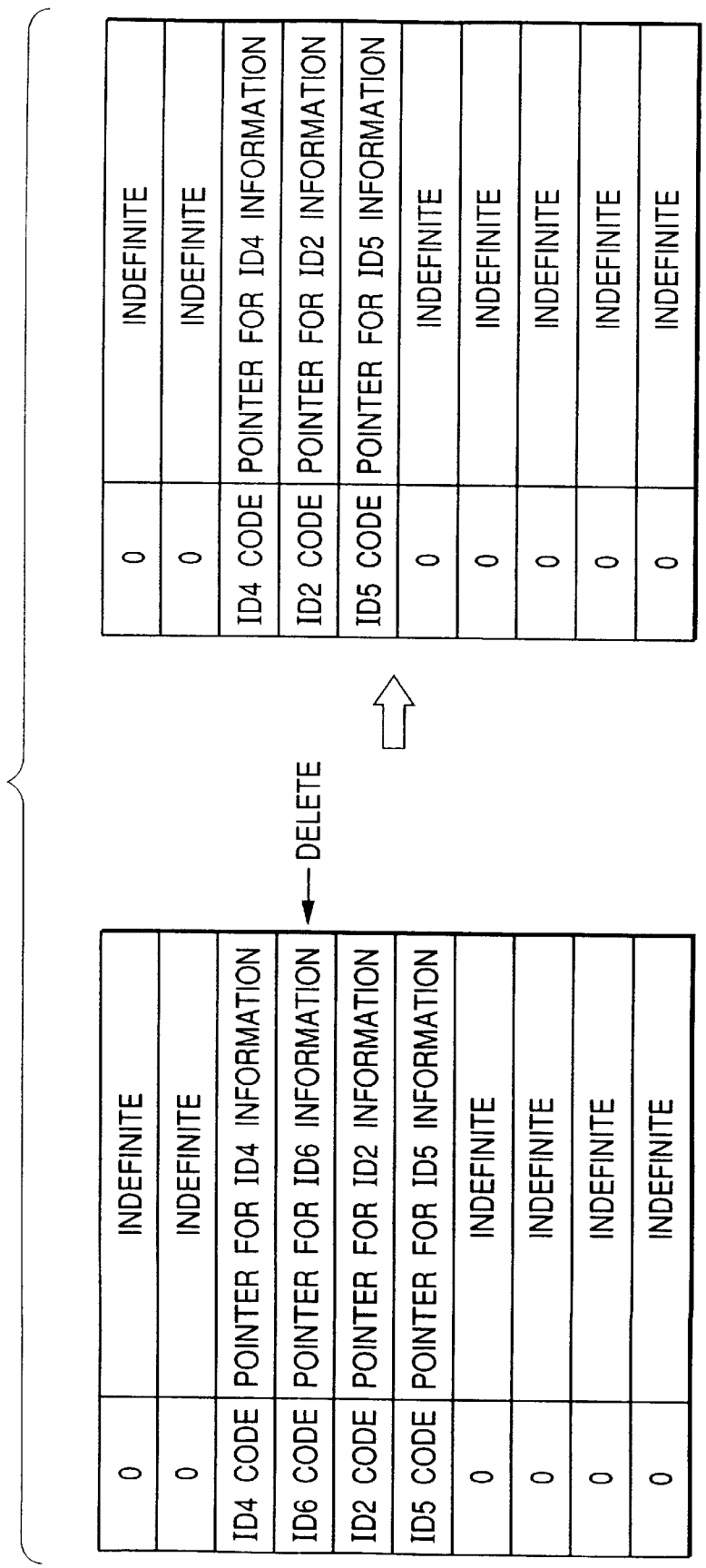
FIG. 20 is a view showing the print reservation table at the cancellation of print reservation in the fifth embodiment.

FIG. 20 is a schematic view showing the mode of deletion of information from the print reservation table.

Thus, even in case the video controller 302 makes print reservations on plural images and in case a part of the reserved print jobs becomes not executable because of the situation in the engine prior to the completion of development of the video data for a certain page, all the executable print jobs reserved after such print job that has become not executable can be executed in continuation by deleting such print job that has become not executable through the above-described process of the print reservation information management unit 313 in response to the instruction from the video controller 302.

Sixth Embodiment

The foregoing embodiment is only given a function of deleting the ID of the print reservation, but the present embodiment allows to change the designated print conditions (source of sheet feeding, destination of sheet discharge, sheet size etc.) prior to the start of the recording sheet feeding operation.

The hardware configuration is same as that shown in FIGS. 14 and 15.

The print reservation information management unit 313 of the present embodiment, upon receiving an instruction from the video controller 302 for changing the print information for the reserved ID, changes the print information for the designated ID in the image print information memory unit 311.

Figure 21:
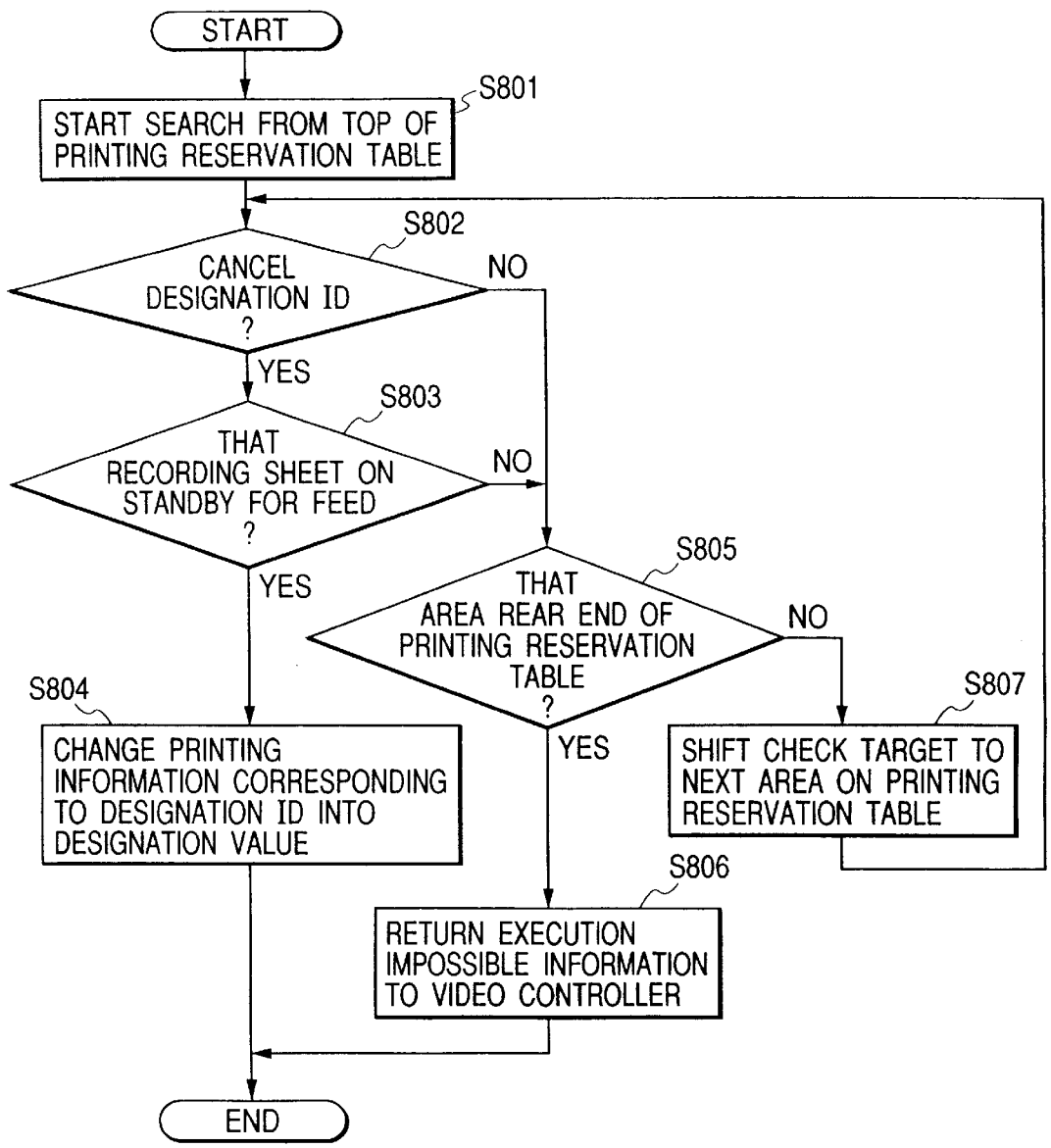
FIG. 21 is a view chart showing the print information changing control of the designation ID in a sixth embodiment.

FIG. 21 shows a flow chart of the reservation information changing process in the print reservation information management unit 313 of the present embodiment. In FIG. 21, steps S801, S801 and S803 and S805, S806 and S807 are same as those S601, S602 and S603 and S605, S606 and S607 in FIG. 19 and will not, therefore, be explained further. If there exists a print reservation of the ID designated by the video controller 302 and the recording sheet designated by such ID is in the stand-by state for feeding, a step S804 makes the access to the print information corresponding to the ID designated by the pointer of the print reservation table and changes it to the print condition designated from the video controller 302.

Thus, even in case the video controller 302 makes print reservations on plural images and in case a part of the reserved print jobs becomes not executable because of the situation in the engine prior to the completion of development of the video data for a certain page, the printing operation can be continued by changing the print condition of the print job that has become not executable through the above-described process of the print reservation information management unit 313 in response to the instruction from the video controller 302. For example, in case the recording sheets in the original designated source of sheet feeding have been exhausted, the printing operation can be continued by re-designating another source having the sheets of the same kind.

Seventh Embodiment

This embodiment enables interchange of the print jobs by the reservation ID's before the start of the recording sheet feeding operation.

The hardware configuration is same as that shown in FIGS. 14 and 15.

The print reservation information management unit 313 of the present embodiment, upon receiving an instruction from the video controller 302 for interchanging two reservation ID's, interchanges the print reservation information for the designated ID's in the image print information memory unit 311.

Figure 22:
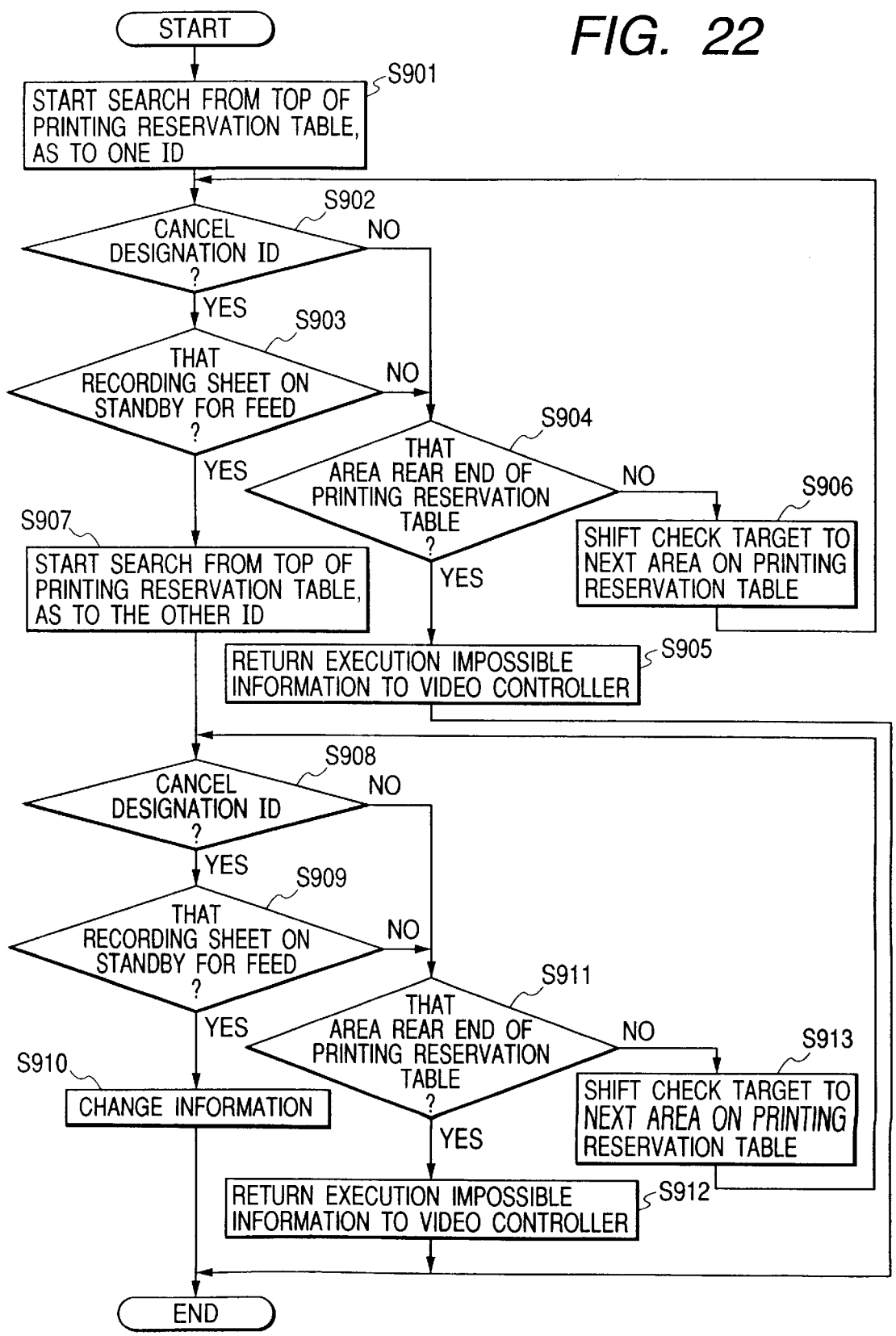
FIG. 22 is a flow chart showing the exchanging control of the print reservations of the designation ID in a seventh embodiment.

FIG. 22 shows a flow chart of the reservation information changing process in the print reservation information management unit 313 of the present embodiment. In FIG. 22, steps S901 and S907 discriminates the possibility of change for each of the ID's designated for interchange. The discrimination for the possibility of change for each ID (S902, S903, S904, S905, S906, S907, S908, S909, S911, S912 and S913) is same as the steps S601, S602, S603, S605, S606 and S607 in FIG. 19 and will not, therefore, be explained further. If there exist print reservations for the ID's designated by the video controller 302 and the recording sheet designated by each designated ID is in the stand-by state for feeding, a step S910 interchanges the information corresponding to the two designated ID's in the print reservation table.

Figure 23:
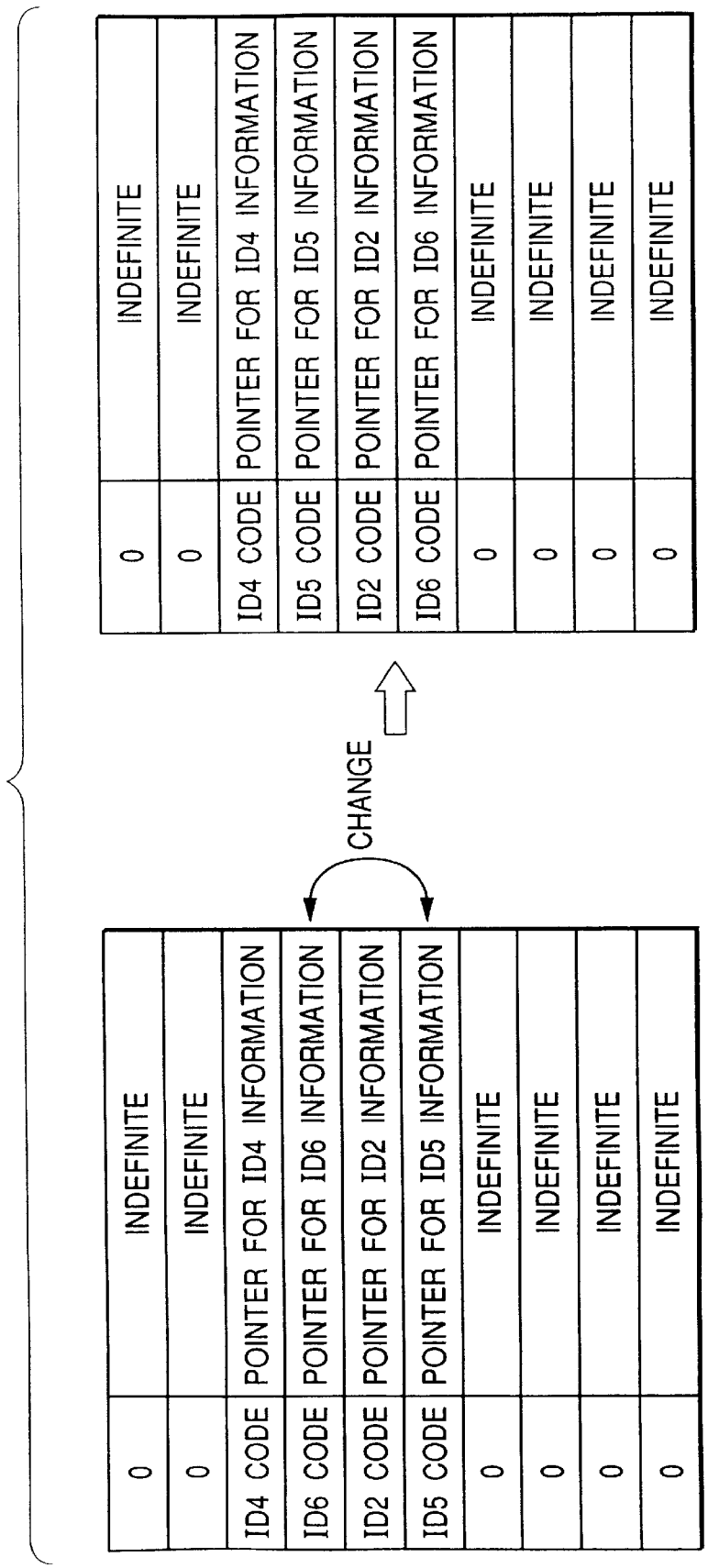
FIG. 23 is a view showing a print reservation table at the exchange of the print reservations in an embodiment.

FIG. 23 is a schematic view showing the mode of interchange of the two information of the print reservation table.

Thus, even in case the video controller 302 makes print reservations on plural images and in case a part of the reserved print jobs becomes not executable because of the situation in the engine prior to the completion of development of the video data for a certain page, the above-described process of the print reservation information management unit 313 allows to continue the printing operation, in response to the instruction from the video controller 302, by interchanging the print job that has become not executable with another executable reservation, thereby executing such another print job at first and postpone execution of such not executable print job until it becomes executable.

The job cancellation, change of the print condition or job interchange explained in the foregoing is executed according to the instruction from the video controller 302, and the video controller 302 may either independently determine the execution of such processes based on various signals from the engine control unit 301, or may determine according an instruction from the host computer or from the operation unit of the printer.

Eighth Embodiment

Figure 24:
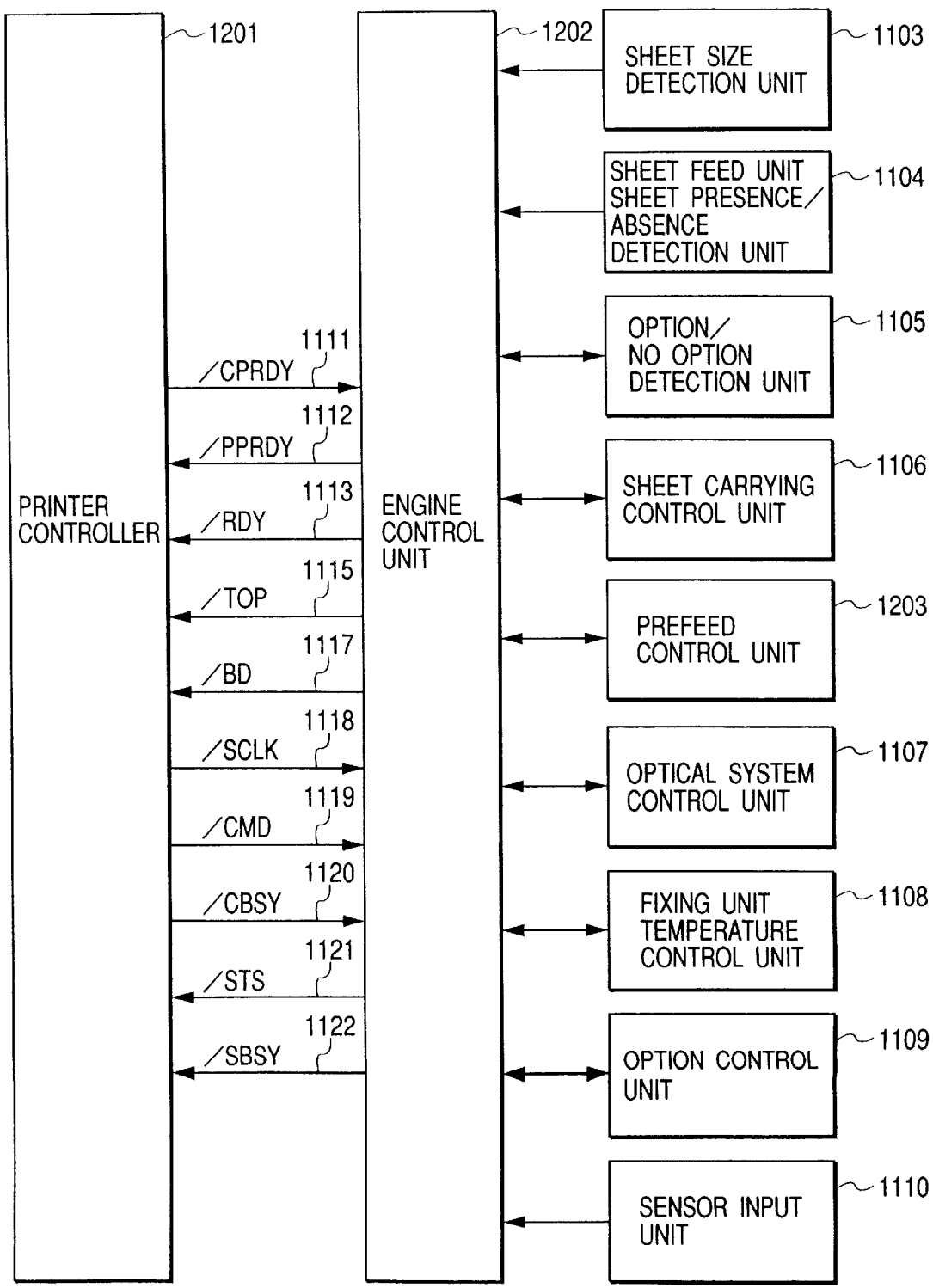
FIG. 24 is a block diagram of a control unit of the printer in an eighth embodiment.

FIG. 24 is a block diagram of the control unit of a printer of the eighth embodiment of the present invention. The configuration of the printer is same as that of the first embodiment shown in FIG. 1.

Figure 36:
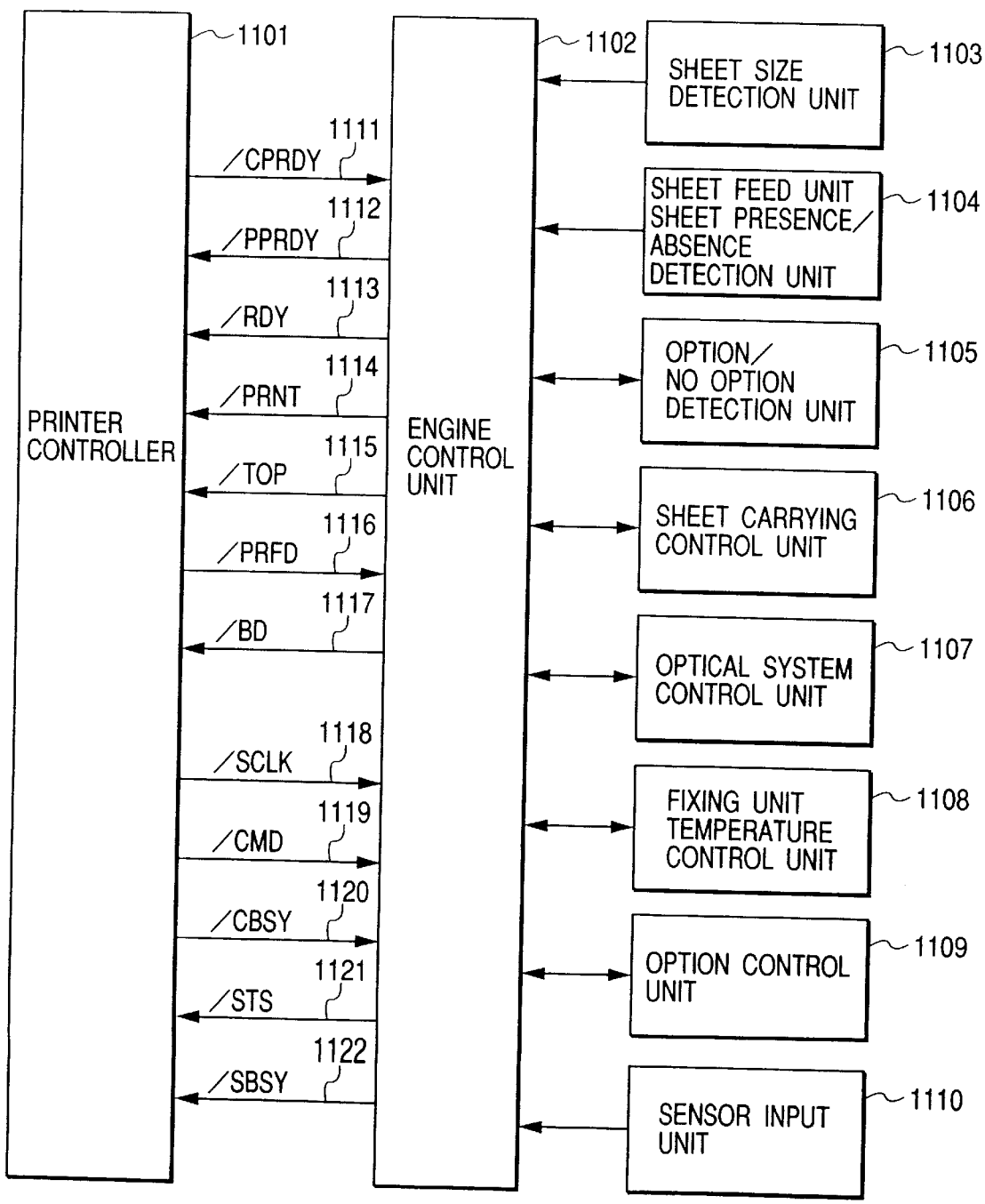
FIG. 36 is a block diagram of a conventional engine control unit.
Figure 37:
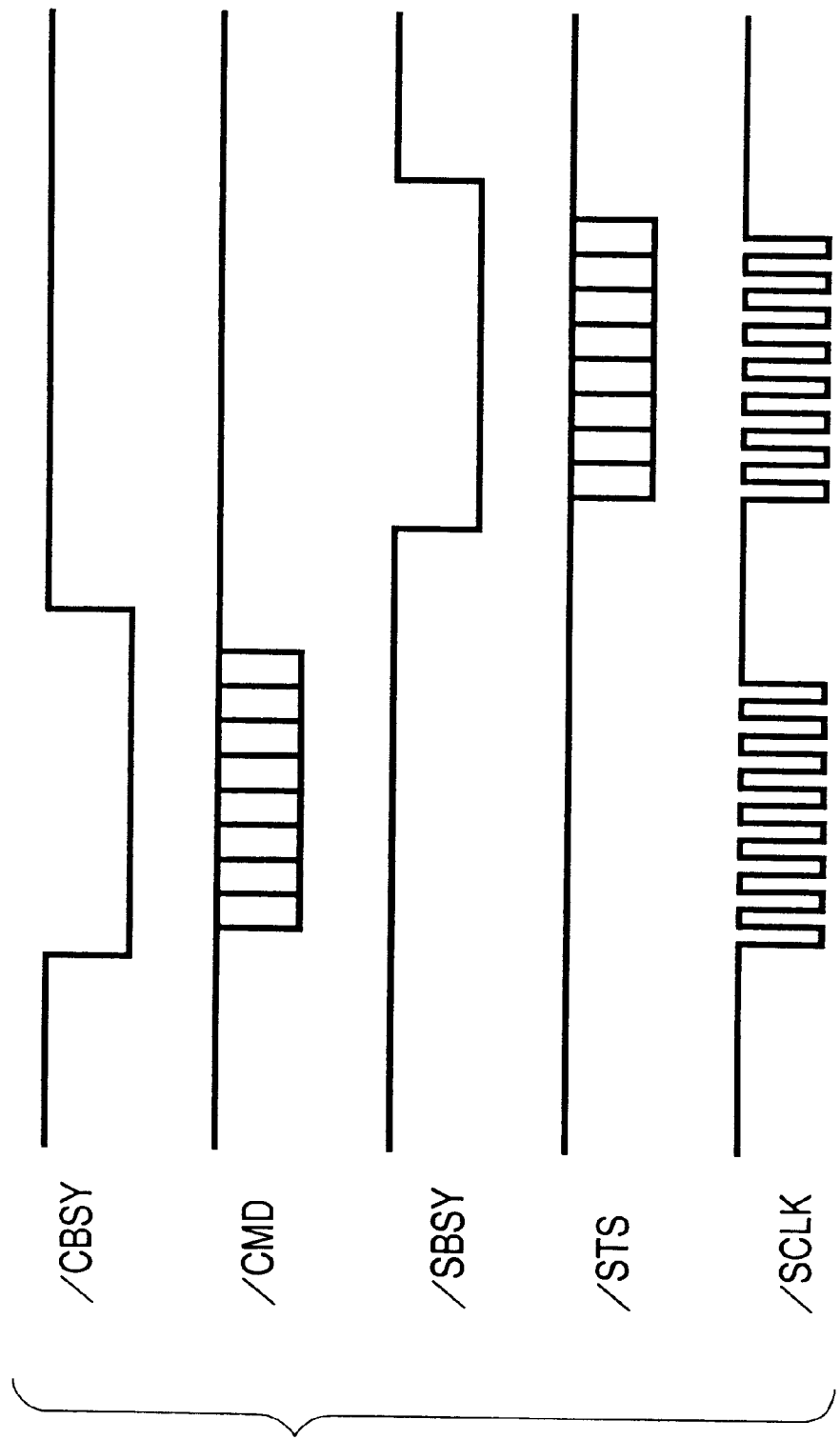
FIG. 37 is a timing chart of the serial communication in the conventional configuration.

In FIG. 24, components equivalent to those in the conventional configuration shown in FIG. 36 are represented by corresponding numbers and will not be explained further.

As shown in FIG. 24, the printer control unit of the present invention is additionally provided with a pre-feed control unit 1203, while the /PRFD signal and the /PRNT signal are not used between the printer controller 1201 and the engine control unit 1202.

In the serial communication, there are employed signals /SCLK, /CMD, /STS, /SBSY and /CBSY as in the conventional configuration, but the data transmitted or received in a communication are composed of 16 bits.

Figure 25:
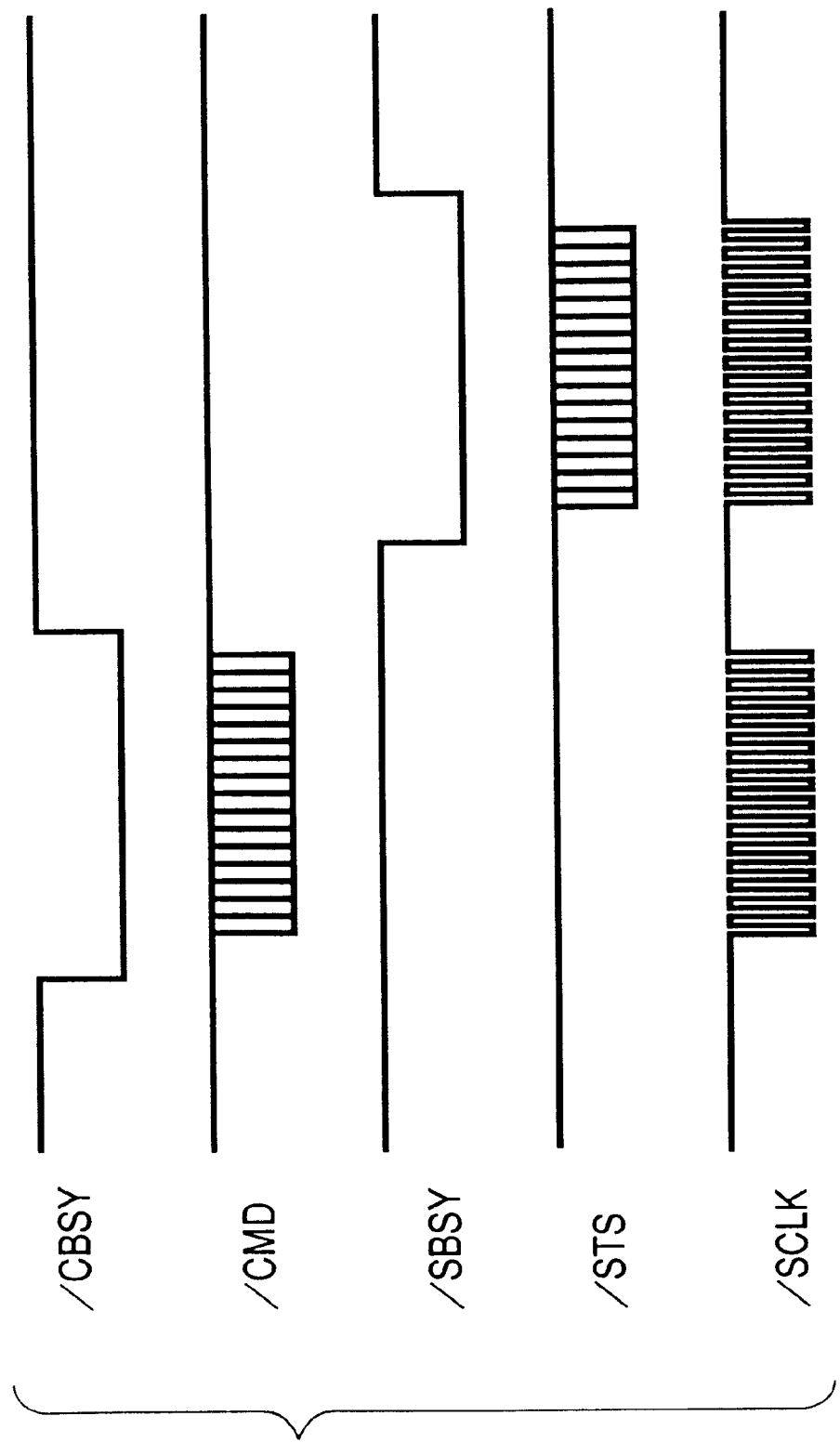
FIG. 25 is a timing chart of the serial communication in the eighth embodiment.

FIG. 25 is a timing chart of the serial communication of the present embodiment.

The serial communication is executed in a mode where the engine control unit 1202 always returns a status in response to a command from the printer controller 1201. The engine control unit 1202 returns the status immediate after the reception of the command.

The printer controller 1201, after setting the /CBSY signal at the low level state, transmits the command by the /CMD signal to the engine control unit 1202 in synchronization with the /SCLK signal. In response to the command, the engine control unit 1202 shifts the /SBSY signal to the low level state to inform the printer controller 1201 of the preparation of status, and transmits the /STS signal in synchronization with the /SCLK signal outputted from the printer controller 1201.

FIG. 26 shows an example of the command from the printer controller 1201.

Within 16 bits, the MSB (first bit) is used to transmit a command error to the printer controller 1201 in case an error is detected in the command, and is always maintained at "0" in the serial communication in the normal state.

Also the LSB (16th bit) is used as an odd number parity bit. Therefore, 14 bits are used for the command codes. Within such 14 bits, the upper 6 bits indicate the command code, while the succeeding 4 bits are used for designating the source of sheet feeding, the succeeding 3 bits are used for designating the designation of sheet discharge, and the remaining 1 bit is used for designating the pre-feed reservation for a sheet next to the current recording sheet. Upon receiving a print command with the pre-feed reservation bit "1", the engine control unit 1202 executes pre-feeding with the source of sheet feeding and destination of sheet discharge same as those in the printing operation.

Upon receiving a print job from the host computer, the printer controller 1201 issues the print command to the engine control unit 1202 at the completion of image development of a predetermined page. If the image information for a next page is received from the host computer at this point, the print command is issued with the pre-feed reservation bit set at "1". The printing operation can be started immediately by advancing the recording sheet to a predetermined position in advance by the pre-feed reservation and by issuing the print command after the image development for the next page is completed. Also, if the image information for the next page is not yet received at the completion of the image development for the current page, the printing command is issued with the pre-feed reservation bit "0" to execute the printing operation without the reservation for the pre-feeding.

Thus, in the conventional configuration, the printing operation is started by the /PRNT signal from the printer controller while the sheet feeding operation is started by the /PRFD signal. In contrast, according to the present invention, the command transmitted from the controller 1201 to the engine control unit 1202 by the serial communication is given the functions of the /PRNT signal and the /PRFD signal, and the engine control unit is to improved as to be capable of starting the sheet feeding operation, independently from the establishment of the vertical synchronization by the /TOP signal.

Figure 27:
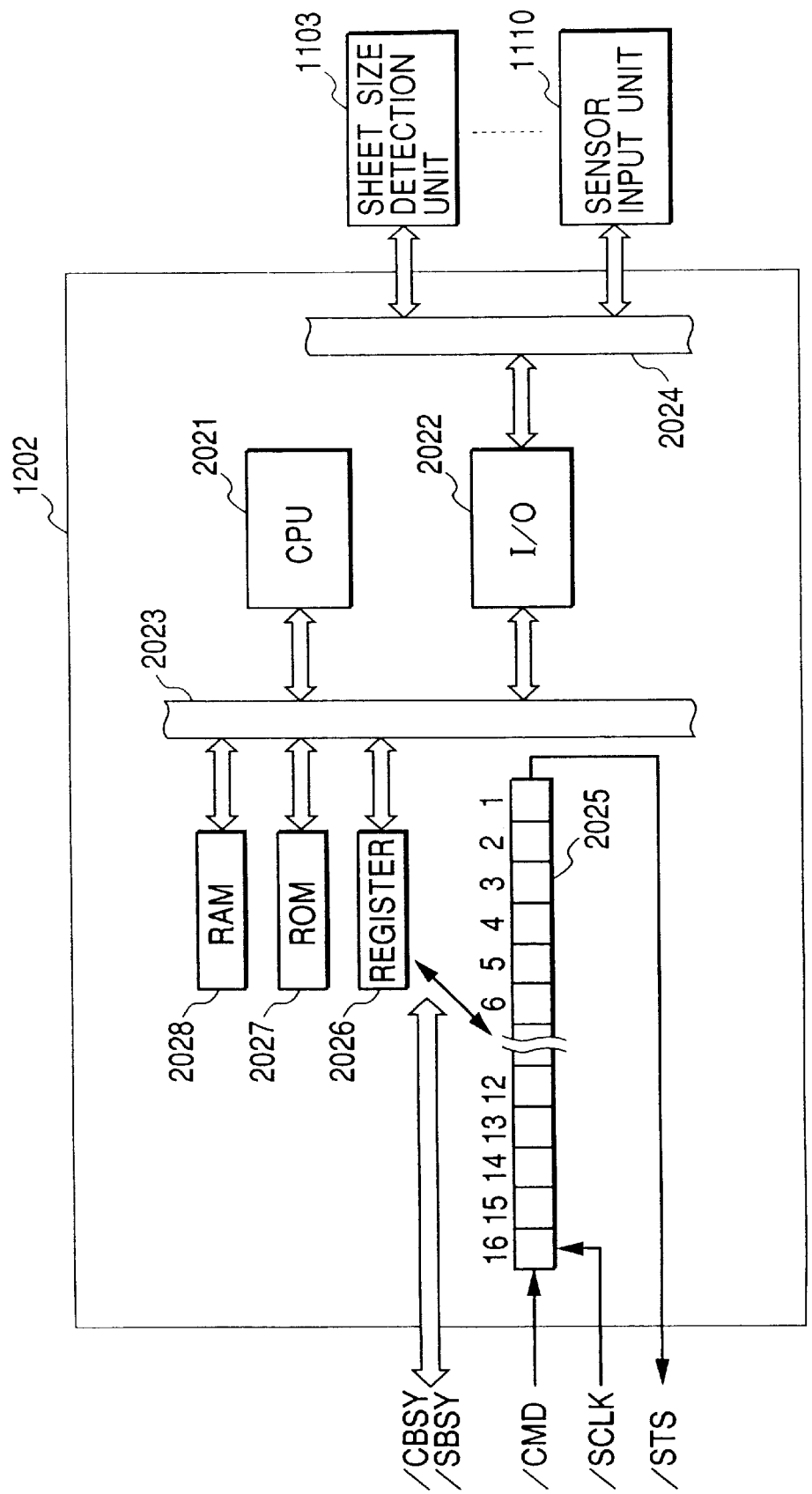
FIG. 27 is a block diagram showing an example of the configuration of the printer control unit in the eighth embodiment.

FIG. 27 shows an example of the configuration of the engine control unit.

The engine control unit 1202 is provided with a CPU 2021 for control, a register 2026 connected to a bus 2023, a ROM 2027 storing advance a process for the received command, and a RAM 2028 serving as a work memory area. It is connected with the control units 1103, 1104, 1105, 1106, 1107, 1108, 1109 and 1110, 1203 through an I/O controller 2022 and a bus 2024, and is also provided with a communication shift register 2025 for communication with the printer controller 1201. The communication with the printer controller 1201 is achieved by fetching the 16-bit command, received by the shift register 2025 when the /CBSY signal is in the true state as explained in the foregoing, into the register 2026 for example at the leading edge of the /CBSY signal. The status information of the engine control unit can be transmitted to the controller 1201 by shifting the content of the register 2026 to the shift register 2025 and also shifting the /SBSY signal to the true state.

Figure 28:
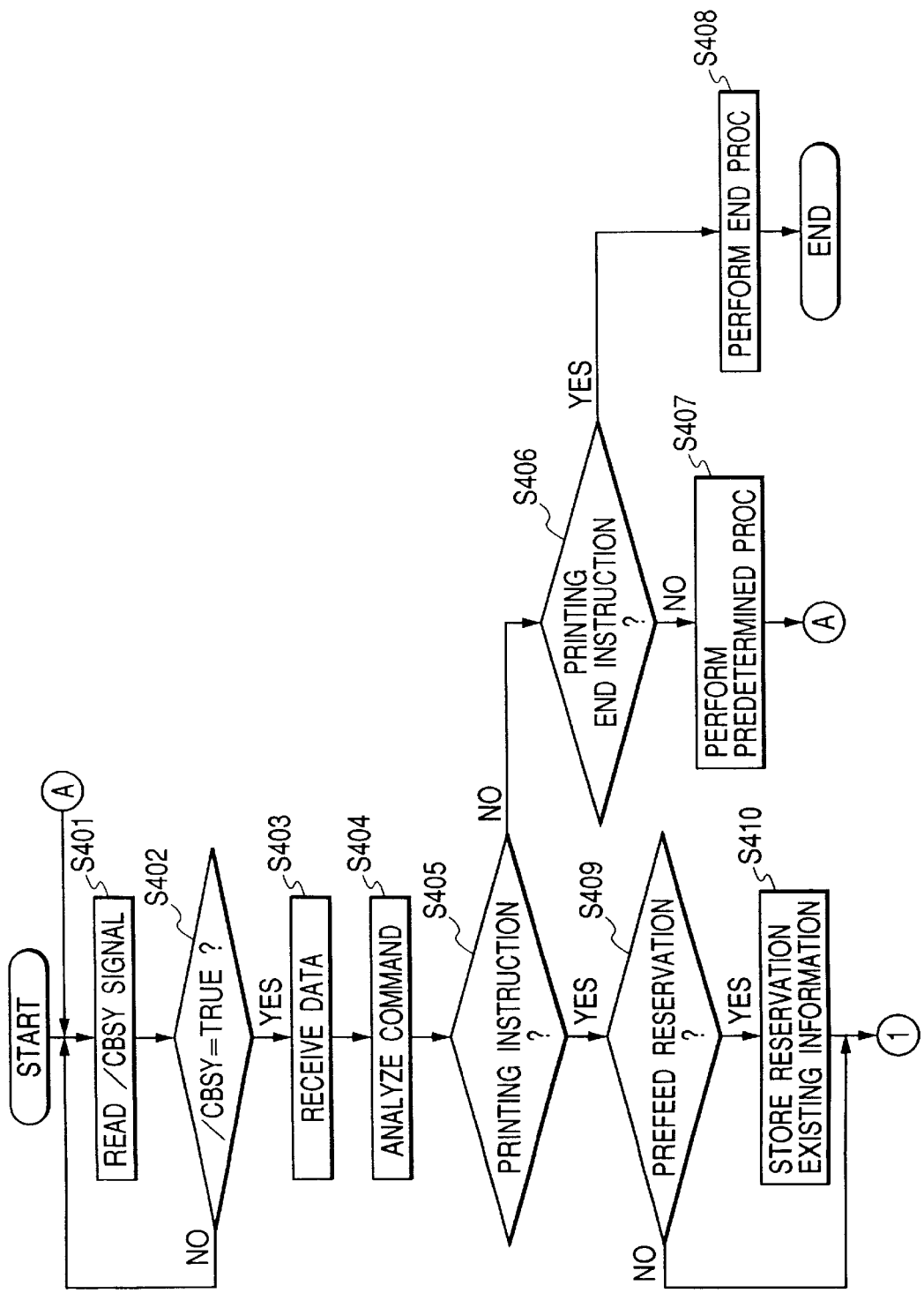
FIG. 28 is a flow chart showing the function of the engine control unit in the eighth embodiment.
Figure 29:
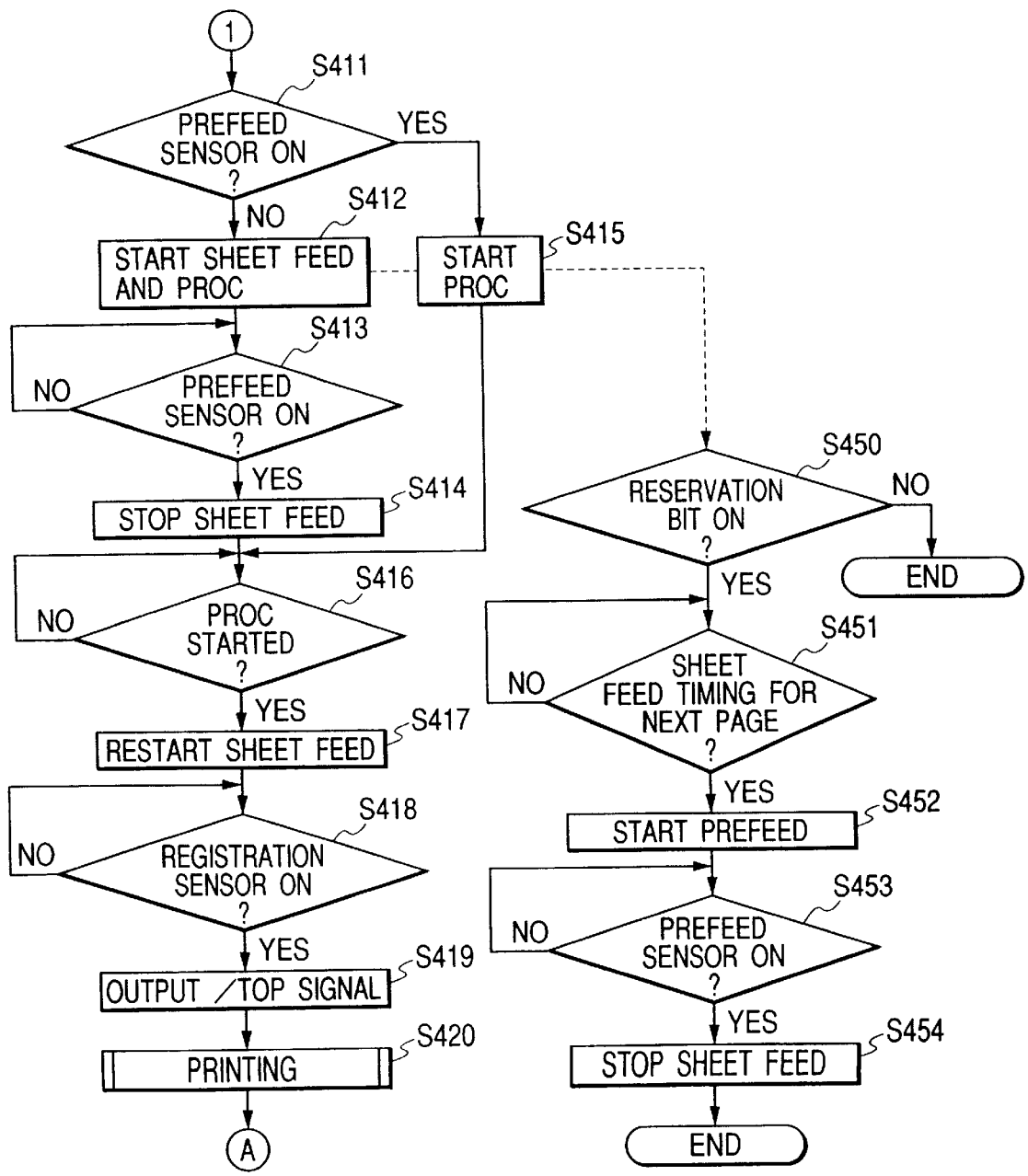
FIG. 29 is a flow chart showing the function of the engine control unit in the eighth embodiment.

FIGS. 28 and 29 are flow charts showing the process of the engine control unit 1202 in the present embodiment. At first the command transmission strobe (/CBSY) signal from the printer controller 1201 is read (S401), and, if it is not in the true state, the signal reading is repeated until it becomes true (S402). When the strobe signal is shifted to the true state, the transmitted command is received (S403), and the command code contained therein is analyzed (S404). If the read command code is a print command, the sequence proceeds to a next step (S405).

If the read command is a print end command, there is executed an ending process (S406, S407 and S408), but, if it is another command, there is executed a corresponding process (S406 and S407) and the sequence returns to the step S401 to awaits the transmission of a next command.

In case the received command code is a print command, there is discriminated presence or absence of the pre-feed reservation (S409), and, if present, information indicating such pre-feed reservation is stored for example in a memory area of the engine control unit 1202 (S410).

After the storage of the pre-feed reservation (or without such storage in the absence of the pre-feed reservation), there is confirmed the state of the pre-feed sensor 116 (FIG. 1) (S411), and, if the pre-feeding operation is already executed, the electrophotographic process is started (S415) and the sequence proceeds to a step S416. If the pre-feeding operation is not yet executed, the sheet feeding operation is started by driving the necessary ones among the rollers 9, 13, 31, 32, 33 and the starting-up of the electrophotographic process is initiated (S412). When the pre-fed sheet is detected by the pre-feed sensor 116 (S413), the feeding operation is terminated (S414) and the completion of starting-up of the electrophotographic process is awaited (S416).

When the starting-up of the electrophotographic process is completed, the rollers 117, 115 are driven to re-start the sheet feeding, and, upon detection of the sheet by the registration sensor 118 (S418), the /TOP signal is outputted (S419) to execute the printing operation (S420).

On the other hand, simultaneous with the starting-up of the electrophotographic process, the pre-feed control unit 1203 discriminates the presence or absence of the pre-feed reservation (S450), and, if present, awaits the sheet feed timing of the next page (S451). The sheet feeding timing for the next page can be calculated for example from the sheet feed timing for the preceding page. It may also be suitably determined, depending on the conditions such as the sheet carrying path length, sheet size or printing speed, for example when the sheet of the preceding page ceases to be detected by the pre-feed sensor 116 or by the registration sensor 118 or when a predetermined time elapses after the start of the printing operation. Otherwise there may be provided a sensor for detecting such timing.

The pre-feeding operation is started when the sheet feed timing for the next page is reached (S452), and the operation is terminated after the sheet is carried until it is detected by the pre-feed sensor (S453 and S454).

Thus, in contrast to the conventional configuration in which the sheet feeding cannot be started until the vertical synchronization is established by the transmission of the /TOP signal and the /PRFD signal is outputted from the printer controller, the configuration of the present invention allows to discriminate presence of absence of the pre-feed reservation independently from the reception of the /PRFD signal thereby enabling to start the pre-feeding operation, and is therefore effective in case the printer has a long sheet carrying path or in case of improving the throughput.

Though not illustrated in FIGS. 28 and 29, it is possible to cancel the designated pre-feeding by outputting a command with the lowermost bit "0", and to instruct the pre-feeding operation by thereafter sending a command with the lowermost bit "1".

Ninth Embodiment

The present embodiment is featured by a print command configuration as shown in FIG. 30, modified from that in the eighth embodiment.

In the present embodiment, the command contains the print command of 4 bits, the source of sheet feeding of 3 bits, the destination of sheet discharge of 2 bits, the pre-feeding reservation of remaining 5 bits.

In the pre-feed reservation area, the lowermost bit indicates presence or absence of pre-feed reservation as in the eighth embodiment, and the remaining 4 bits indicate the number of pre-feed reservations after the execution of the print command, namely a number equal to the total print number minus one.

Because of the presence of such field for designating the number of pre-feed reservations in the command, the printer controller 1201, upon receiving the job of a predetermined sheet number from the host computer, can instruct the pre-feeding operation to the engine control unit 1202 by a single command until the end of such job instead of executing the pre-feed reservation for each sheet, by designating the number of pre-feed reservations to the engine control unit 1202.

Thus, the printer controller 1201, after designating the number of pre-feed reservations in the initial command, is only required in the subsequent print commands to set only the lowest bit in the pre-feed reservation field. If the pre-feed reservation has to be canceled by the situation of the printer controller 1201, there can be issued a print command with the lowest bit "0".

Figure 31:
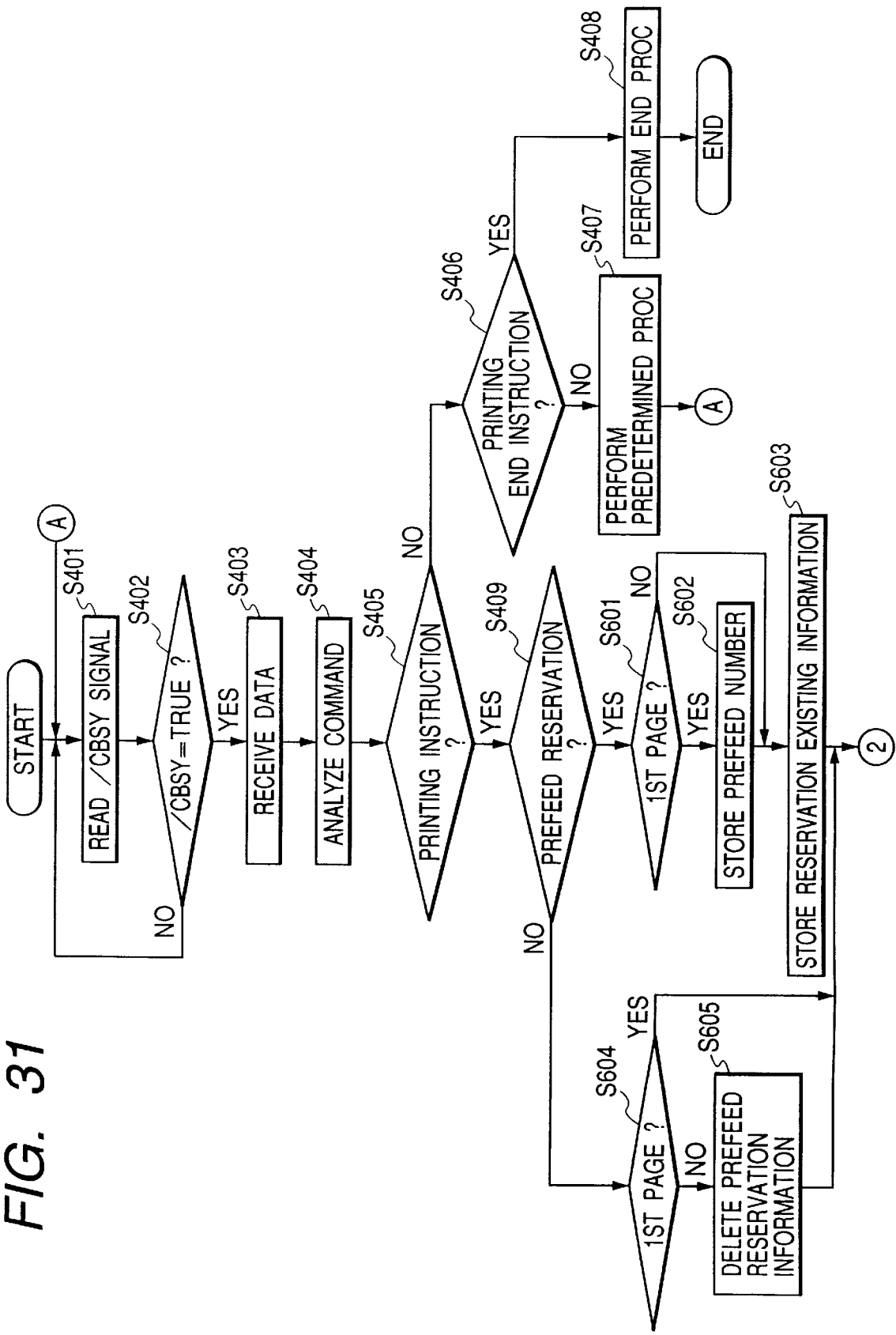
FIG. 31 is a flow chart showing the function of the engine control unit in the ninth embodiment.
Figure 32:
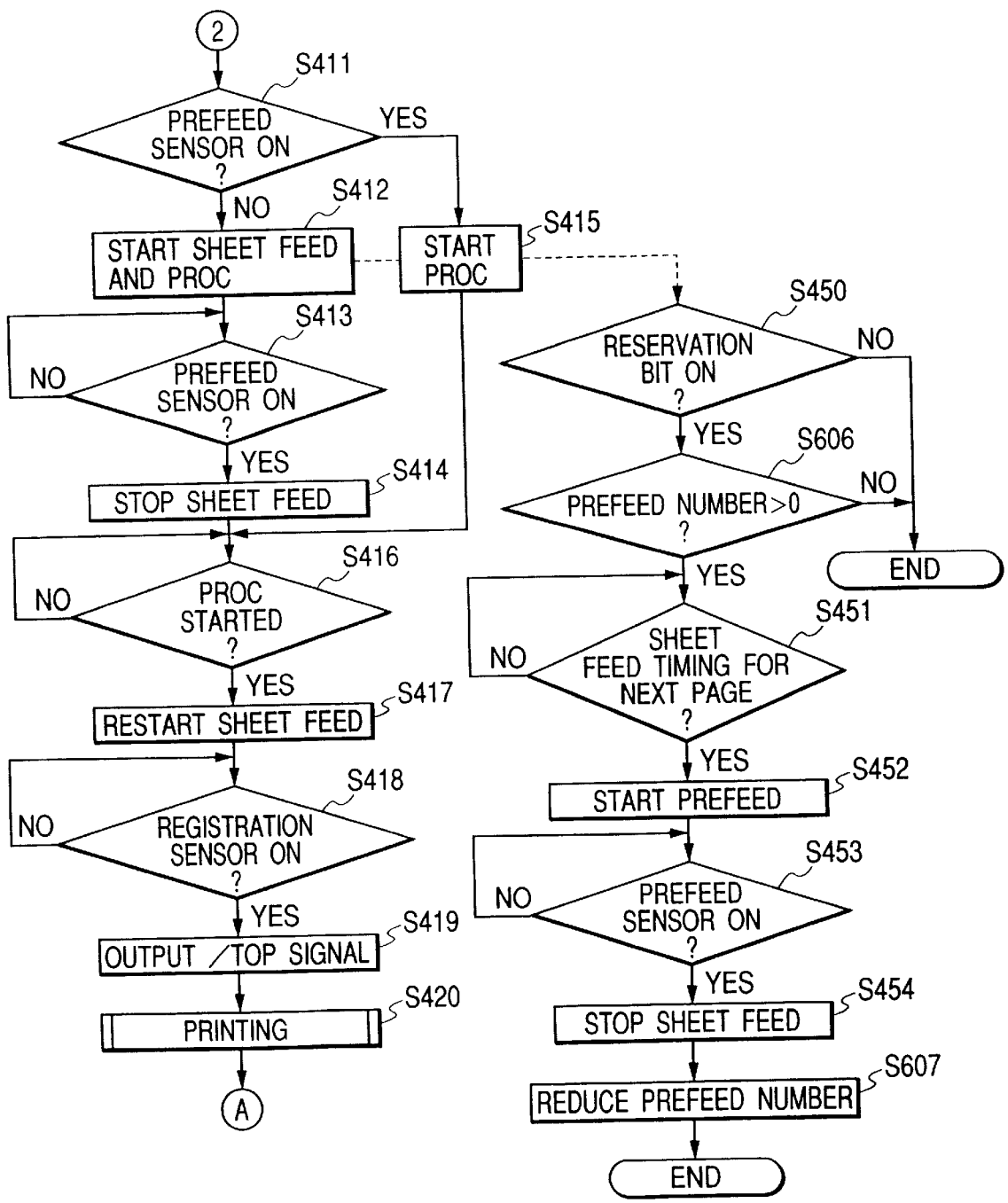
FIG. 32 is a flow chart showing the function of the engine control unit in the ninth embodiment.

FIGS. 31 and 32 are flow charts showing the function of the engine control unit in the present embodiment, wherein operations same as those in the eighth embodiment (FIGS. 28 and 29) are represented by same numbers as therein and will not be explained further.

The process of the present embodiment is featured by a fact that the process branches depending on the sequential page number of printing after the presence/absence of the pre-feed reservation is discriminated (S409), and that the process for the pre-feed numbers is added.

More specifically, in case the pre-feeding reservation is present and in case of the print instruction for the first page, the pre-feed number field in the command is referred to and the content of the field is stored in a predetermined memory area in the pre-feed control unit 1203 (S601 and S602). For the print instruction for the second or subsequent page, the pre-feed number is not stored. This is because the pre-feed number is already designated in a preceding command and the pre-feed number field in the command received at this point may not contain any meaningful value. After the reservation information is stored in the predetermined memory area of the pre-feed control unit 1203 (S411), the operations are same as those in the eighth embodiment.

On the other hand, even if the pre-feed reservation is absent, there is discriminated whether the command is the print instruction for the first page (S604), and, if for the first page, the sequence shifts to a process similar to that in the eighth embodiment. If for the second or subsequent page, there is erased the predetermined area storing the pre-feed reservation (S605), whereby the pre-feed reservation can be canceled in the course of the printing operation.

Simultaneous with the initiation of the starting-up of the electrophotographic process (S412 or S415), the pre-feed control unit 1203 discriminates presence or absence of the pre-feed reservation (S450), and, if present and if the remaining pre-feed number is not zero (S450→S606), there is awaited the sheet feed timing for the next page (S451) and the pre-feeding operation is executed (S453 and S454). Upon completion of the pre-feed operation, the remaining pre-feed number stored in the memory area of the pre-feed control unit 1203 is decreased by one.

The above-described process allows to designate the number of pre-feed operations in the beginning in a job for which the number of prints is known in advance, thereby alleviating the load of the printer controller and enabling the output operation fully exploiting the maximum ability of the print engine.

Tenth Embodiment

FIG. 33 shows another example of the command configuration employable in the present invention.

In the present embodiment, the command contains the print command of 5 bits, the source of sheet feeding of 3 bits, the destination of sheet discharge of 2 bits and the condition of pre-feed reservation of remaining 4 bits. As in the eighth and ninth embodiments, the lowermost bit (15th bit) indicates the presence or absence of pre-feed reservation as in the above-mentioned foregoing embodiments, designating the pre-feed reservation for the next page by "1", while the remaining 3 bits designate the source of sheet for pre-feeding. Such source of sheet pre-feeding may be same as or different from that for the printing operation. In this manner the source of sheet pre-feeding can be set independently from the source of sheet feeding for the preceding page.

The destination of discharge of the pre-fed sheet is designated by the field for designating the destination of sheet discharge in the print command issued subsequently by the printer controller 1201.

In case the source of sheet feeding designated for the pre-fed sheet is different from the source of sheet feeding in the succeeding print command, the engine control unit 1202 returns an error command status to the printer controller 1201, indicating the error in the designation of the source of sheet feeding.

Figure 34:
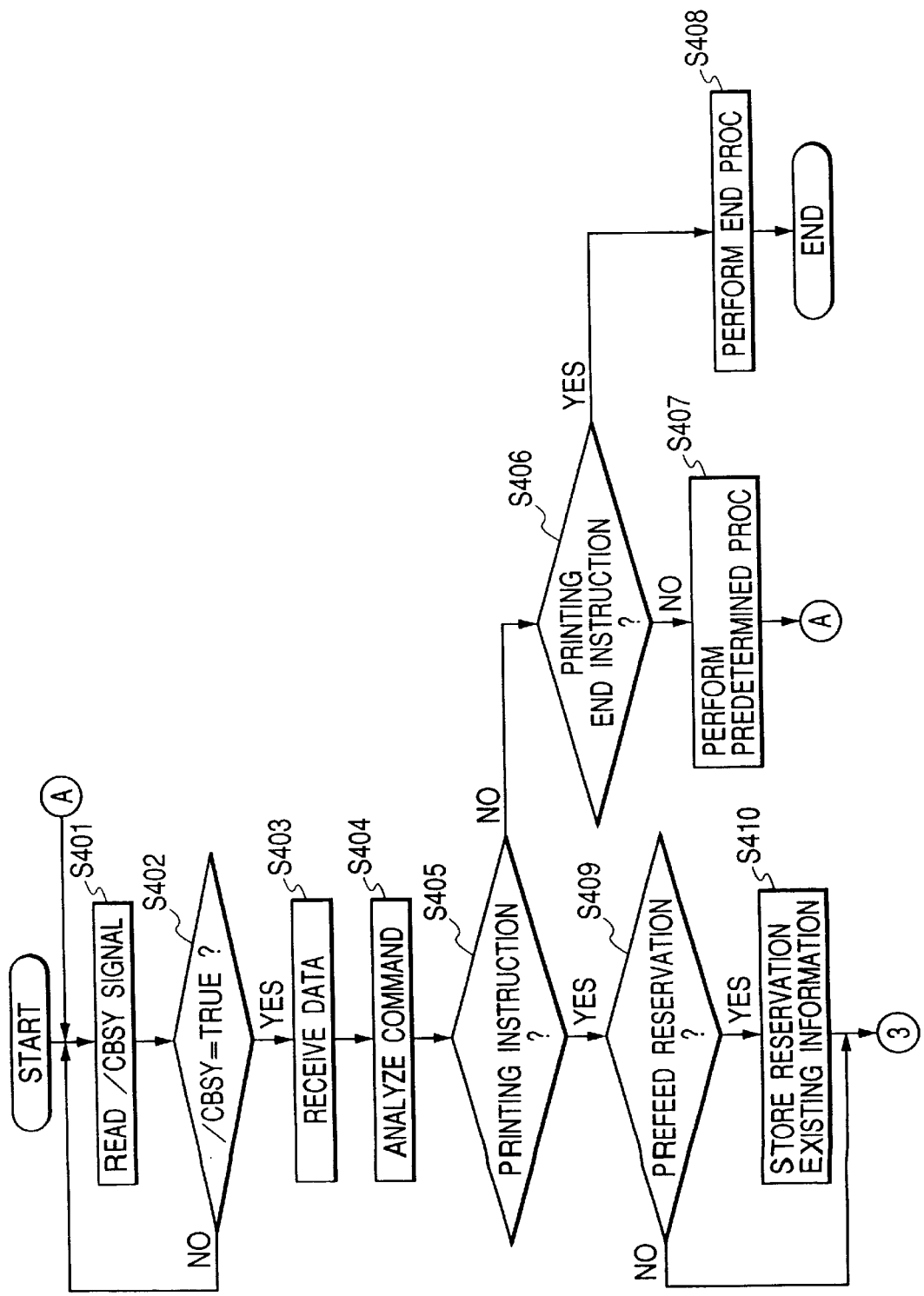
FIG. 34 is a flow chart showing the function of the engine control unit in the tenth embodiment.
Figure 35:
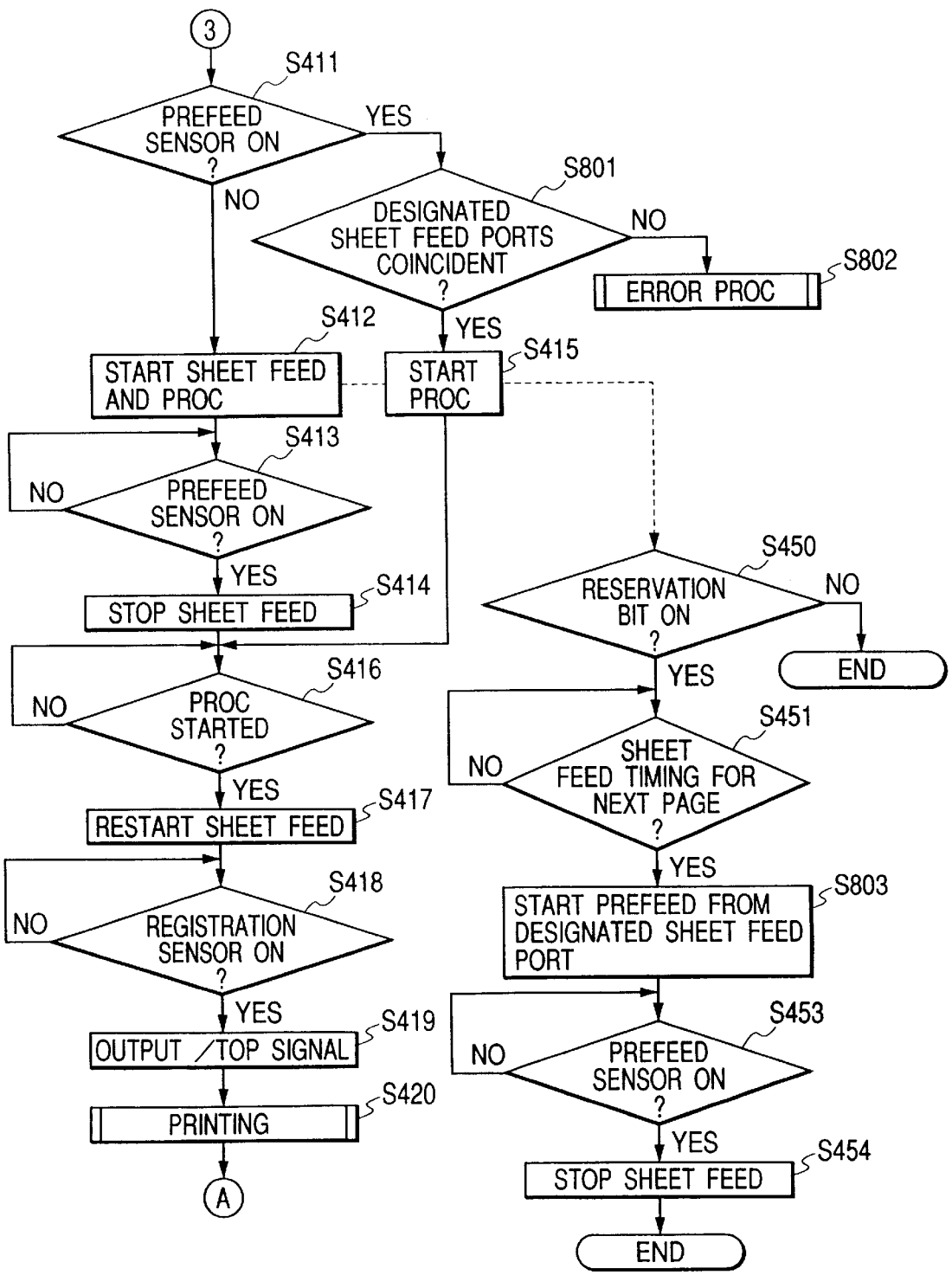
FIG. 35 is a flow chart showing the function of the engine control unit in the tenth embodiment.

FIGS. 34 and 35 are flow charts showing the process of the engine control unit in the present embodiment, wherein steps same as those in FIGS. 28 and 29 are represented by same numbers and will not be explained further.

In case the pre-feed reservation is already made and the pre-feeding operation is already completed at the reception of the print instruction (S411), there is discriminated whether the source of sheet feeding designated in the print instruction coincides with the source of sheet feeding designated in the pre-feeding (S801), and, if not, an error process is executed (S802). Such error process may be to discharge the pre-fed sheet and to start the sheet feeding operation again from the source designated at the print instruction, or to continue the printing operation while outputting an error message if the sheet size is same. It is naturally possible also be interrupt the printing operation.

Other processes will not be explained further as they are same as those in the eighth embodiment, except that the pre-feeding is executed from the designated source (S803).

In the eighth to tenth embodiments, there may be applied the ID management for each sheet according to any of the first to seventh embodiments.

In the preceding embodiments, the recording sheets waits n the pre-feed position until the electrophotographic process is started up, but, as long as the recording sheet does not overlap with the preceding sheet, the recording sheet may be advanced from the pre-feed position to the position of the registration sensor in the course of printing of the preceding page or of the starting-up of the electrophotographic process and stopped in such position to awaits the completion of starting-up of the process. Such configuration allows to further shorten the carrying distance from the starting-up of the process to the actual printing position.

The present invention may be applied to a configuration in which the printer controller and the engine control unit are present different equipment, or to an apparatus consisting of a single equipment (such as a copying apparatus or a facsimile apparatus). It is also applicable to a recording apparatus of non-electrophotographic process.

Further, the objects of the present invention can naturally be attained in a case of supplying a system or an apparatus with a memory medium storing program codes of a software realizing the functions of the foregoing embodiments and a computer (or CPU or MPU) in such system or apparatus reads and executes the program codes stored in the memory medium.

In such case the program codes themselves of the software realize the functions of the foregoing embodiments, and the memory medium storing the program codes constitutes the present invention.

The memory medium storing such program codes can be, for example, a floppy disk, a hard disk, an optical disk, a magnetooptical disk, a CD-ROM, a CR-R, a magnetic tape, a non-volatile memory card, or a ROM.

The present invention also includes not only a case where the functions of the above-mentioned embodiments are realized by the execution of the program codes read by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the above-mentioned embodiments.

What is claimed is:

1. A recording apparatus comprising:
   input means for inputting print data from an external device;
   ID setting means for setting an ID for each page of the print data inputted by said input means;
   print condition designation means for designating a print condition, corresponding to the ID set by said ID setting means;
   print reservation means for reserving a print operation by storing the ID and the print condition in a print reservation memory;
   control means for causing the reserved print operation to be executed according to content of said print reservation memory; and
   reservation cancellation means adapted, upon receiving and instruction for designating an ID, the page corresponding to which is to be cancelled from the print reservation, and for erasing the designated ID and print condition from said print reservation memory, if a sheet corresponding to the designated ID in said print reservation memory is in a stand-by state for sheet feeding.

2. A recording apparatus according to claim 1, further comprising a video controller for managing the input print data and an engine control unit for controlling the functions of various units of the apparatus, wherein said engine control unit is adapted to effect reservation of the print operation and cancellation thereof according to an instruction from said video controller.

3. A recording apparatus comprising:
   input means for inputting print data from an external device;
   ID setting means for setting an ID for each page of the print data inputted by said input means;
   print condition designation means for designating a print condition, corresponding to the ID set by said ID setting means;
   print reservation means for reserving a print operation by storing the ID and the print condition in a print reservation memory;
   control means for causing the reserved print operation to be executed according to content of said print reservation memory; and
   re-writing means adapted, upon receiving an instruction for designating an ID, the print condition corresponding to which is to be re-written to said the print reservation memory, and for re-writing the print condition of the designated ID, if a sheet corresponding to the designated ID in said print reservation memory is in a stand-by state for sheet feeding.

4. A recording apparatus according to claim 3, further comprising a video controller for managing the input print data and an engine control unit for controlling the functions of various units of the apparatus, wherein said engine control unit is adapted to re-write the print operation according to an instruction from said video controller.

5. A recording apparatus according to claim 3, wherein said re-writing means is adapted to re-write the designation for the source of sheet feeding, the destination of sheet discharge or the sheet size.

6. A recording apparatus comprising:
   input means for inputting print data from an external device;
   ID setting means for setting an ID for each page of the print data inputted by said input means;
   print condition designation means for designating a print condition, corresponding to the ID set by said ID setting means;
   print reservation means for reserving a print operation by storing the ID and the print condition in a print reservation memory;

control means for causing the reserved print operation to be executed according to content of said print reservation memory; and interchanging means adapted, upon receiving an instruction for designating ID's, the print reservations corresponding to which are to be interchanged, and for interchanging the order of printing of the pages corresponding to the designated ID's, if sheets corresponding to the designated plural ID's in said print reservation memory are in a stand-by state for sheet feeding.

7. A recording apparatus according to claim 6, further comprising a video controller for managing the input print data and an engine control unit for controlling the functions of various units of the apparatus, wherein said engine control unit is adapted to effect interchange of the print reservations according to an instruction from said video controller.

8. A printing apparatus for effecting a printing operation based on print data and a command from an external video controller, comprising:

reservation means for effecting a print reservation in a print reservation memory corresponding to an ID assigned for each sheet of data to be printed; and discrimination means for discriminating whether a sheet corresponding to each ID is in a stand-by state for sheet feeding, wherein said reservation means is adapted, upon receiving a command for deleting the print reservation of a designated ID from said video controller, to delete said designated ID from said print reservation memory, and to delete the print reservation of said designated ID if said discrimination means identifies that the sheet corresponding to the designated ID is in a stand-by state for sheet feeding.

9. A printing apparatus for effecting a printing operation based on print data and a command from an external video controller, comprising:

reservation means for storing a print condition designated from said video controller corresponding to an ID assigned for each sheet of data to be printed, thereby making a print reservation; and discrimination means for discriminating whether a sheet corresponding to each ID is in a stand-by state for sheet feeding, wherein said reservation means is adapted, upon receiving a command for changing the print condition of the print reservation of an ID designated from said video controller, to change the stored print condition of the designated ID to the designated print condition when said discrimination means identifies that the sheet corresponding to the designated ID is in a stand-by state for sheet feeding.

10. A printing apparatus for effecting a printing operation based on print data and a command from an external video controller, comprising:

reservation means for effecting a print reservation in a print reservation memory corresponding to an ID assigned for each sheet of data to be printed; and discrimination means for discriminating whether a sheet corresponding to each ID is in a stand-by state for sheet feeding, wherein said reservation means is adapted, upon receiving a command for interchanging the print reservations of plural designated ID's from said video controller, to search said designated plural ID's from said print reservation table and to interchange the print reservations of said plural designated ID's if said discrimination means identifies that the sheets corresponding to the plural designated ID's are in a stand-by state for sheet feeding.

11. A control method for a printing apparatus for effecting a printing operation based on print data and a command from an external video controller, comprising steps of:

effecting a print reservation in a print reservation memory correspond to an ID assigned by said video controller for each sheet of data to be printed;

discriminating reception of a command for deleting the print reservation of an ID designated by said video controller;

upon receiving said command, discriminating whether a sheet corresponding to the designated ID is in a stand-by state for sheet feeding; and if in the stand-by state for sheet feeding, deleting the print reservation of said designated ID.

12. A control method of a printing apparatus for effecting a printing operation based on print data and a command from an external video controller, comprising steps of:

storing a print condition corresponding to an ID assigned by said video controller for each sheet of data to be printed thereby making a print reservation;

discriminating reception of a command for changing the print condition of the print reservation of an ID designated by said video controller;

upon receiving said command, discriminating whether a sheet corresponding to the designated ID is in a stand-by state for sheet feeding; and if in the stand-by state for sheet feeding, changing the print condition of the stored designated ID to the designated print condition.

13. A control method for a printing apparatus for effecting a printing operation based on print data and a command from an external video controller, comprising steps of:

effecting a print reservation in a print reservation memory corresponding to an ID assigned by said video controller for each sheet of data to be printed; and discriminating reception of a command for interchanging the print reservations of plural ID's designated by said aid video controller;

upon receiving said command, searching said designated ID from said print reservation memory and discriminating whether a sheet corresponding to each of the designated ID's is in a stand-by state for sheet feeding; and if in the sand-by state for sheet feeding, interchanging the print reservations of said designated plural ID's.

14. An apparatus comprising:

storage means for storing, in a case where there are print data of plural pages, predetermined information for each of the plural pages;

input means for inputting an instruction to specify a desired page in the pages of which predetermined information have been stored in said storage means; and process means for changing or deleting the predetermined information of the page specified by the instruction input by said input means.

15. An apparatus according to claim 14, wherein said storage means stores the predetermined information for each page in correspondence with ID information, and said input means inputs the ID information.

16. An apparatus according to claim 14, further comprising print control means for printing the page of which predetermined information has been stored in said storage means.

17. An apparatus according to claim 14, wherein the predetermined information for each page includes, with respect to a sheet to be used for the printing of the corresponding page, at least one of information representing sheet feed means for feeding the sheet, information representing sheet discharge means for discharging the sheet, and size information.

18. An apparatus according to claim 14, wherein, when a sheet feed operation for the page specified by the instruction input by said input means is not started, said process means changes or deletes the predetermined information of the corresponding page.

19. A method comprising:

a storage step of storing, in a case where there are print data of plural pages, predetermined information for each of the plural pages;

an input step of inputting an instruction to specify a desired page in the pages of which predetermined information were stored in said storage step; and a process step of changing or deleting the predetermined information of the page specified by the instruction input in said input step.

20. A method according to claim 19, wherein said storage step stores the predetermined information for each page in correspondence with ID information, and said input step inputs the ID information.

21. A method according to claim 19, further comprising a print control step of printing the page of which predetermined information was store in said storage step.

22. A method according to claim 19, wherein the predetermined information for each page includes, with respect to a sheet to be used for the printing of the corresponding page, at least one of information representing a sheet feed means for feeding the sheet, information representing a sheet discharge means for discharging the sheet, and size information.

23. A method according to claim 19, wherein, when a sheet feed operation for the page specified by the instruction input in said input step is not started, said process step changes or deletes the predetermined information of the corresponding page.

24. A computer-readable storage medium which stores a program to execute a method comprising:

a storage step of storing, in a case where there are print data of plural pages, predetermined information for each of the plural pages;

an input step of inputting an instruction to specify a desired page in the pages of which predetermined information were stored in said storage step; and a process step of changing or deleting the predetermined information of the page specified by the instruction input in said input step.

25. A medium according to claim 24, wherein said storage step stores the predetermined information for each page in correspondence with ID information, and said input step inputs the ID information.

26. A medium according to claim 24, further comprising a print control step of printing the page of which predetermined information was stored in said storage step.

27. A medium according to claim 24, wherein the predetermined information for each page includes, with respect to a sheet to be used for the printing of the corresponding page, at least one of information representing a sheet feed means for feeding the sheet, information representing a sheet discharge mans for discharging the sheet, and size information.

28. A medium according to claim 24, wherein, when a sheet feed operation for the page specified by the instruction input in said input step is not started, said process step changes or deletes the predetermined information of the corresponding page.

* * * * *

UNITED STATES PATENT AND TRADEMARK OFFICE
CERTIFICATE OF CORRECTION

PATENT NO. : 6,266,151 B1
DATED : July 24, 2001
INVENTOR(S) : Tatsuto Tachibana et al.

It is certified that error appears in the above-identified patent and that said Letters Patent is hereby corrected as shown below:

Title page,
Item [56], FOREIGN PATENT DOCUMENTS,
"09231028" should read -- 9-231028 --.

Drawings,
Sheet 32, FIG. 33, "SEET" (3 occurrences) should read -- SHEET --.

Column 1,
Lines 14 and 15, "sheet" should read -- sheets --; and
Line 21, "sheet." should read -- sheets. --.

Column 3,
Line 11, "capable" should read -- capable of --.

Column 4,
Line 6, "aparats" should read -- apparatus --.

Column 6,
Line 52, "show" should read -- shown --.

Column 8,
Line 5, "ID." should read -- ID). --; and
Line 16, "embodiment" should read -- embodiment of --.

Column 9,
Line 66, "sheet" should read -- sheets --.

Column 10,
Line 27, "that 410" should read -- sheet 410 --.

Column 12,
Line 2, "designates" should read -- designated --.

UNITED STATES PATENT AND TRADEMARK OFFICE
CERTIFICATE OF CORRECTION

PATENT NO. : 6,266,151 B1
DATED : July 24, 2001
INVENTOR(S) : Tatsuto Tachibana et al.

It is certified that error appears in the above-identified patent and that said Letters Patent is hereby corrected as shown below:

Column 14,
Line 1, "are" should read -- area --; and
Line 16, "in case" should read -- in the case of --.

Column 15,
Line 39, "S801" (second occurrence) should read -- S802 --.

Column 16,
Line 12, "discriminates" should read -- discriminate --;
Line 25, "information" should read -- designated ID's --;
Line 37, "postpone" should read -- postponing --; and
Line 44, "according" should read -- according an --.

Column 17,
Line 4, "immediate" should read -- immediately --;
Line 56, "to improved" should read -- so improved --; and
Line 65, "storing advance" should read -- storing in advance --.

Column 19,
Line 8, "presence of" should read -- presence or --.

Column 21,
Line 14, "sheets" should read -- sheet --;
Line 15, "n" should read -- in --;
Line 21, "awaits" should read -- await --; and
Line 27, "present different" should read -- present in different --.

Column 22,
Line 41, "the" should be deleted.

Column 24,
Line 9, "correspond" should read -- corresponding --; and
Line 50, "sand-by" should read -- stand-by --.

UNITED STATES PATENT AND TRADEMARK OFFICE
CERTIFICATE OF CORRECTION

PATENT NO.    : 6,266,151 B1
DATED         : July 24, 2001
INVENTOR(S)   : Tatsuto Tachibana et al.

It is certified that error appears in the above-identified patent and that said Letters Patent is hereby corrected as shown below:

Column 25,
Line 31, "store" should read -- stored --.

Column 26,
Line 30, "mans" should read -- means --.

Signed and Sealed this

Twenty-fifth Day of June, 2002

Attest:

Attesting Officer

JAMES E. ROGAN
Director of the United States Patent and Trademark Office